(12) United States Patent
Anazawa et al.

(10) Patent No.: US 7,244,374 B2
(45) Date of Patent: Jul. 17, 2007

(54) COMPOSITE AND METHOD OF MANUFACTURING THE SAME

(75) Inventors: Kazunori Anazawa, Nakai-machi (JP);
Chikara Manabe, Nakai-machi (JP);
Masaki Hirakata, Nakai-machi (JP);
Kentaro Kishi, Nakai-machi (JP);
Taishi Shigematsu, Nakai-machi (JP);
Miho Watanabe, Nakai-machi (JP);
Takashi Isozaki, Nakai-machi (JP);
Hiroyuki Watanabe, Nakai-machi (JP);
Shigeki Ooma, Nakai-machi (JP);
Shinsuke Okada, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 434 days.

(21) Appl. No.: 10/909,369

(22) Filed: Aug. 3, 2004

(65) Prior Publication Data
US 2005/0087726 A1   Apr. 28, 2005

(30) Foreign Application Priority Data

Oct. 28, 2003 (JP) .............................. 2003-367402
May 11, 2004 (JP) .............................. 2004-141086

(51) Int. Cl.
*H01B 1/00* (2006.01)
*H01B 1/12* (2006.01)

(52) U.S. Cl. ...................... 252/500; 502/182; 365/129; 428/300.1

(58) Field of Classification Search ................ 502/182; 423/447.2, 447.1; 252/503, 510, 500; 428/300.1; 365/129
See application file for complete search history.

(56) References Cited

U.S. PATENT DOCUMENTS

| | | | |
|---|---|---|---|
| 6,426,134 B1 * | 7/2002 | Lavin et al. | 428/300.1 |
| 6,574,130 B2 * | 6/2003 | Segal et al. | 365/129 |
| 7,041,620 B2 * | 5/2006 | Smalley et al. | 502/182 |
| 7,070,753 B2 * | 7/2006 | Niu et al. | 423/447.1 |
| 2002/0172639 A1 * | 11/2002 | Horiuchi et al. | 423/447.2 |
| 2004/0265209 A1 * | 12/2004 | Colbert et al. | 423/447.1 |

FOREIGN PATENT DOCUMENTS

| | | |
|---|---|---|
| JP | A 10-168502 | 6/1998 |
| WO | WO 97/32571 | 9/1997 |
| WO | WO 01/07694 A1 | 2/2001 |
| WO | WO 01/57284 A1 | 8/2001 |

OTHER PUBLICATIONS

XP-002318512, Section Ch, Week 200333, Derwent Publications Ltd., London, Great Britain; Mar. 10, 2003.

* cited by examiner

*Primary Examiner*—Mark Kopec
*Assistant Examiner*—Khanh T. Nguyen
(74) *Attorney, Agent, or Firm*—Oliff & Berridge, PLC

(57) ABSTRACT

Provided are: a composite formed by mixing a carbon nanotube structure and a metal-containing material, the carbon nanotube structure having a network structure constructed by mutually cross-linking functional groups bonded to plural carbon nanotubes through chemical bonding of the functional groups together; and a method of manufacturing the same. The composite of the carbon nanotube and the metal-containing material is capable of effectively using characteristics of the carbon nanotube structure.

37 Claims, 5 Drawing Sheets

SCHEME FOR POLYMERIZATION REACTION BETWEEN
CARBON NANOTUBE CARBOXYLIC ACID METHYL ESTER AND GLYCERIN BY ESTER EXCHANGE

REACTION SCHEME FOR INTRODUCING CARBOXYL GROUP INTO CARBON NANOTUBE

SCHEME FOR METHYL ESTERIFICATION REACTION
OF CARBON NANOTUBE CARBOXYLIC ACID

SCHEME FOR POLYMERIZATION REACTION BETWEEN CARBON NANOTUBE CARBOXYLIC ACID METHYL ESTER AND GLYCERIN BY ESTER EXCHANGE

COMPOSITE AND METHOD OF MANUFACTURING THE SAME

FIELD OF THE INVENTION AND RELATED ART STATEMENT

The present invention relates to a composite of a carbon nanotube structure and a metal-containing material, and to a method of manufacturing the same.

Carbon nanotubes (CNTs), with their unique shapes and characteristics, are being considered for various applications. A carbon nanotube has a tubular shape of one-dimensional nature which is obtained by rolling one or more graphene sheets composed of six-membered rings of carbon atoms into a tube. A carbon nanotube which is formed from one graphene sheet is called a single-wall carbon nanotube (SWNT) while a carbon nanotube which is formed from multiple graphene sheets is called a multi-wall carbon nanotube (MWNT). SWNTs are about 1 nm in diameter whereas multi-wall carbon nanotubes measure several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semiconductive because six-membered rings of carbon atoms in carbon nanotubes are arranged into a spiral. In addition, the electric conductivity of carbon nanotubes is very high and allows a current flow at a current density of 100 mA/cm$^2$ or more.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied researches that exploit the excellent characteristics of carbon nanotubes have been heretofore made extensively. To give a few examples, a carbon nanotube is added as a resin reinforcer or as a conductive composite material while another research uses a carbon nanotube as a probe of a scanning probe microscope. Carbon nanotubes have also been used as minute electron sources, field emission electronic devices, and flat displays. An application that is being developed is to use a carbon nanotube as a hydrogen storage.

As described above, carbon nanotubes may find use in various applications. In particular, the applications of the carbon nanotubes to electronic materials and electronic devices have been attracting attention.

Those carbon nanotubes may find use in various applications. An example of the applications, which will be put into practical use in the near future, is an application of adding a carbon nanotube as a resin reinforcer or a conductive composite material.

For example, JP 10-168502 A discloses that a composite particle obtained by mixing metal powder and crystalline carbon (such as graphite, a carbon fiber, carbon black, fullerene, or a carbon nanotube) and by pressurizing and refining the mixture is molded into a composite with high thermal conductivity.

However, a mixture of crystalline carbon and metal as described in JP 10-168502 A only accidentally causes contact between crystalline carbons, so that a carbon nanotube network tends to be rough. Therefore, a heat-conduction path tends to be discontinuous, thereby not allowing sufficient use of the intrinsic good conductive characteristics of a carbon nanotube. Moreover, stable characteristics are hardly obtained. Likewise, with regard to mechanical characteristics, a structure constructed by the contact between or entanglement of carbon nanotubes involves a problem in that stability is low. More specifically, characteristics change upon deformation of the carbon nanotube.

In addition, in JP 10-168502 A, the mixture is formed into fine powder and then molded into a composite by hot pressing. It is particularly difficult to use the composite in a thin film form.

SUMMARY OF THE INVENTION

Therefore, the present invention aims to solve the above problems involved in the prior art. Specifically, the present invention aims to provide a composite of a carbon nanotube and a metal-containing material capable of effectively using the characteristics of a carbon nanotube structure, and a method of manufacturing the same.

The present invention described below can achieve the aim.

(Composite of the Present Invention)

That is, according to the present invention, there is provided a composite formed by mixing a carbon nanotube structure and a metal-containing material, the composite being characterized in that the carbon nanotube structure has a network structure constructed by mutually cross-linking functional groups bonded to plural carbon nanotubes through chemical bonding of the functional groups together.

The composite of the present invention uses a carbon nanotube structure in which plural carbon nanotubes construct a network structure via plural cross-linked sites. As a result, unlike the case where a mere carbon nanotube dispersion film is used, the contact and arrangement conditions of carbon nanotubes do not become unstable, and thus, the carbon nanotube structure remains stable. Therefore, high mechanical strength and thermal and electrical characteristics peculiar to a carbon nanotube can be stably used.

In addition, in the carbon nanotube structure, plural carbon nanotubes construct a network structure via plural cross-linked sites. As a result, excellent characteristics of a carbon nanotube can be stably used unlike a material such as a mere carbon nanotube dispersion film or a resin dispersion film in which carbon nanotubes are only accidentally in contact with each other and are substantially isolated from each other.

The carbon nanotube structure is preferably obtained by curing a solution containing plural carbon nanotubes to which functional groups are bonded to chemically bond together the plural functional groups bonded to the carbon nanotubes for formation of a cross-linked site.

Of those, a preferable first structure for the cross-linked site is a structure cross-linking the plural functional groups together with a cross-linking agent in the solution, and the cross-linking agent is more preferably not self-polymerizable.

By forming the carbon nanotube structure through the above curing of the solution, the cross-linked site where the carbon nanotubes are cross-linked together has a cross-linking structure in which residues of the functional groups remaining after a cross-linking reaction are connected together using a connecting group which is a residue of the cross-linking agent remaining after the cross-linking reaction. Therefore, an electrical or thermal conductivity and mechanical strength can be improved.

If the cross-linking agent has a property of polymerizing with other cross-linking agents (self-polymerizability), the connecting group may contain a polymer in which two or more cross-linking agents are connected. Therefore, mechanical and thermal properties may not be exerted sufficiently because an actual density of the carbon nanotubes in the carbon nanotube structure becomes low.

On the other hand, if the cross-linking agent is not self-polymerizable, a gap between each of the carbon nanotubes can be controlled to a size of a cross-linking agent residue used. Therefore, a desired network structure of carbon nanotubes can be obtained with high duplicability. Further, reducing the size of the cross-linking agent residue can extremely narrow a gap between each of the carbon nanotubes physically. In addition, carbon nanotubes in the structure can be densely structured.

Therefore, if the cross-linking agent is not self-polymerizable, the carbon nanotube structure according to the present invention can exert the physical characteristics of a carbon nanotube itself in a high level.

As a result, a metal-containing material as a filler in the composite of the present invention serves as a mechanical reinforcer or a heat- or current-conduction path to provide the composite with high strength and conductivity. In the present invention, the term "self-polymerizable" refers to a property of which the cross-linking agents may prompt a polymerization reaction with each other in the presence of other components such as water or in the absence of other components. On the other hand, the term "not self-polymerizable" means that the cross-linking agent has no such a property.

If a cross-linking agent which is not self-polymerizable is selected as the cross-linking agent, a cross-linked site, where carbon nanotubes in the carbon nanotube structure are cross-linked together, has primarily an identical cross-linking structure. Furthermore, the connecting group preferably employs hydrocarbon as its skeleton, and the number of carbon atoms of the hydrocarbon is preferably 2 to 10. Reducing the number of carbon atoms can shorten the length of a cross-linked site and sufficiently narrow a gap between carbon nanotubes as compared to the length of a carbon nanotube itself. As a result, a carbon nanotube structure of a network structure composed substantially only of carbon nanotubes can be obtained.

Examples of the functional group include —OH, —COOH, —COOR (where R represents a substituted or unsubstituted hydrocarbon group), —COX (where X represents a halogen atom), —NH$_2$, and —NCO. A selection of at least one functional group from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent from the group consisting of the above cross-linking agents is preferable, and in such a case, a functional group, which may prompt a cross-linking reaction with the selected cross-linking agent, is selected as the cross-linking agent.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Examples of the particularly preferable functional group include —COOR (where R represents a substituted or unsubstituted hydrocarbon group). Introduction of a carboxyl group into carbon nanotubes is relatively easy, and the resultant substance (carbon nanotube carboxylic acid) has high reactivity. Therefore, after the formation of the substance, it is relatively easy to esterify the substance to convert its functional group into —COOR (where R represents a substituted or unsubstituted hydrocarbon group). The functional group easily prompts a cross-linking reaction and is suitable for formation of a carbon nanotube structure.

A polyol can be exemplified as the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to the environment.

In the cross-linked site in which plural carbon nanotubes are mutually cross-linked, the functional group is —COOR (where R represents a substituted or unsubstituted hydrocarbon group). The cross-linked site is —COO(CH$_2$)$_2$OCO— in the case where ethylene glycol is used as the cross-linking agent. In the case where glycerin is used as the cross-linking agent, the cross-linked site is —COOCH$_2$CHOHCH$_2$OCO— or —COOCH$_2$CH(OCO—)CH$_2$OH if two OH groups contribute to the cross-linking, and the cross-linked site is —COOCH$_2$CH(OCO—)CH$_2$OCO— if three OH groups contribute to the cross-linking. The chemical structure of the cross-linked site may be a chemical structure selected from the group consisting of the above four structures.

A second structure preferable as the structure of the cross-linked site is a structure formed through chemical bonding of plural functional groups together. More preferably, a reaction that forms the chemical bonding is anyone of dehydration condensation, a substitution reaction, an addition reaction, and an oxidative reaction.

The carbon nanotube structure of this case forms a cross-linked site by chemically bonding together functional groups bonded to the carbon nanotubes, to thereby form a network structure. Therefore, the size of the cross-linked site for bonding the carbon nanotubes together becomes constant depending on the functional group to be bonded. Since a carbon nanotube has an extremely stable chemical structure, there is a low possibility that functional groups or the like excluding a functional group to modify the carbon nanotube are bonded to the carbon nanotube. In the case where the functional groups are chemically bonded together, the designed structure of the cross-linked site can be obtained, thereby providing a homogeneous carbon nanotube structure.

Furthermore, the functional groups are chemically bonded together, so that the length of the cross-linked site between the carbon nanotubes can be shorter than that in the case where the functional groups are cross-linked together with a cross-linking agent. Therefore, the carbon nanotube structure is dense, and an effect peculiar to a carbon nanotube is easily used.

The chemical bonding of functional groups together is preferably one selected from —COOCO—, —O—, —NHCO—, —COO—, and —NCH— in a condensation reaction. The chemical bonding is preferably at least one selected from —NH—, —S—, and —O— in a substitution reaction. The chemical bonding is preferably —NHCOO— in an addition reaction. The chemical bonding is preferably —S—S— in an oxidative reaction.

Examples of the functional group to be bonded to a carbon nanotube prior to the reaction include —OH, —COOH, —COOR (where R represents a substituted or unsubstituted hydrocarbon group), —X, —COX (where X represents a halogen atom), —SH, —CHO, —OSO$_2$CH$_3$, —OSO$_2$(C$_6$H$_4$)CH$_3$, —NH$_2$, and —NCO. It is preferable to select at least one functional group from the group consisting of the above functional groups.

Particularly preferable examples of the functional group include —COOH. A carboxyl group can be relatively easily introduced into a carbon nanotube. In addition, the resultant substance (carbon nanotube carboxylic acid) has high reactivity, easily prompts a condensation reaction by using a dehydration condensation agent such as N-ethyl-N'-(3-dimethylaminopropyl)carbodiimide, and is thus suitable for forming a structure.

Examples of a metal-containing material as a filler to be mixed with the carbon nanotube structure in the composite of the present invention include Al, B, Mg, K, Ca, Ag, Cr, Co, Sm, Dy, Hg, Sn, Ce, Th, Pb, Hf, Ni, Nd, Ba, Bi, Pr, Be, Mn, La, Li, Rb, Zn, Mn, Fe, Cu, Y, and Cd (including an alloy, organometallic compound, metal salt, and metal oxide each containing at least one of them). It is preferable to select at least one material from the group consisting of the above materials.

The plural carbon nanotubes to be used in the composite of the present invention are each particularly preferably a multi-wall carbon nanotube having a high mechanical strength for exerting a function of a reinforcer intended for improving the mechanical strength. For exerting the other functions, the plural carbon nanotubes are also each preferably a multi-wall carbon nanotube because the characteristics of a carbon nanotube hardly deteriorate at a manufacturing stage as described in the section below titled (Method of Manufacturing Composite of the Present Invention).

(Method of Manufacturing Composite of the Present Invention)

In the meantime, a method of manufacturing a composite of the present invention (hereinafter, simply referred to as "manufacturing method of the present invention" in some cases) includes the steps of: supplying the surface of a substrate with a solution containing plural carbon nanotubes to which plural functional groups are bonded; mutually cross-linking the plural carbon nanotubes through chemical bonding of the plural functional groups together to construct a network structure and forming a carbon nanotube structure; and mixing the carbon nanotube structure and a metal-containing material.

According to the present invention, in the supplying step of supplying the surface of a substrate with a solution containing plural carbon nanotubes to which plural functional groups are bonded (hereinafter, simply referred to as "cross-linking solution" in some cases), a structure (in the form of a film, a layer, a block, or the like) is first formed from the cross-linking solution on the whole surface of the substrate or a part of the surface of the substrate. Then, in the subsequent cross-linking step, the structure is cured to form a carbon nanotube structure in which the plural carbon nanotubes are mutually cross-linked to construct a network structure. Following those two steps can stabilize the structure itself of the carbon nanotube structure on the surface of the substrate.

The carbon nanotube structure thus obtained is mixed with a metal-containing material as a filler in the subsequent mixing step. Following the step provides a composite of the carbon nanotube structure and the metal-containing material. Examples of the metal-containing material to be mixed include Al, B, Mg, K, Ca, Ag, Cr, Co, Sm, Dy, Hg, Sn, Ce, Th, Pb, Hf, Ni, Nd, Ba, Bi, Pr, Be, Mn, La, Li, Rb, Zn, Mn, Fe, Cu, Y, and Cd (including an alloy, organometallic compound, metal salt, and metal oxide each containing at least one of the materials). It is preferable to select at least one material from the group consisting of the above materials.

In the manufacturing method of the present invention, it is important to allow the carbon nanotube structure to have a network structure via cross-linked sites of the functional groups.

In forming chemical bonding of functional groups together, a first method preferable for forming a cross-linked site is a method of cross-linking the functional groups together with a cross-linking agent in the solution. More preferably, the cross-linking agent is not self-polymerizable. If a self-polymerizable cross-linking agent is used as the cross-linking agent and the cross-linking agent prompts a polymerization reaction with other cross-linking agents during or prior to the cross-linking reaction in the cross-linking step, the bonding of the cross-linking agents becomes large and long, thereby inevitably enlarging a gap itself between carbon nanotubes bonded to the cross-linking agents. At this time, it is practically difficult to control the degree of reaction by the self-polymerizability of the cross-linking agents. As a result, a cross-linking structure between carbon nanotubes varies depending on the polymerization condition of the cross-linking agents.

However, if a cross-linking agent which is not self-polymerizable is used, the cross-linking agents do not mutually polymerize at least during and prior to the cross-linking step. In addition, in a cross-linked site between carbon nanotubes, a residue formed by one cross-linking reaction of the cross-linking agents is present as a connecting group between residues of the functional groups remaining after the cross-linking reaction. As a result, the carbon nanotube structure has uniform properties as a whole.

In addition, unless the cross-linking agents cross-link together, a gap between carbon nanotubes can be controlled even when plural kinds of cross-linking agents which are not self-polymerizable are mixed to cross-link carbon nanotubes by the plural kinds of cross-linking agents. Therefore, a similar effect of reducing variations can be obtained. On the other hand, in the case where different cross-linking agents are used stepwise to cross-link carbon nanotubes, the skeleton of a complete network structure of the carbon nanotubes is in a state where a distance between carbon nanotubes is controlled if the carbon nanotubes are cross-linked by using a cross-linking agent which is not self-polymerizable at the first cross-linking stage. Therefore, a self-polymerizable cross-linking agent or a cross-linking agent which cross-links with the first cross-linking agent (or a residue thereof) may be used at the subsequent cross-linking step.

In the method of manufacturing a composite of the present invention, examples of the functional group in forming the cross-linked site using the cross-linking agent include —OH, —COOH, —COOR (where R represents a substituted or unsubstituted hydrocarbon group), —COX (where X represents a halogen atom), —NH$_2$, and —NCO.

It is preferable to select at least one functional group from the group consisting of the above functional groups. In such a case, a cross-linking agent, which may prompt a cross-linking reaction with the selected functional group, is selected as the cross-linking agent.

Further, preferable examples of the cross-linking agent include a polyol, a polyamine, a polycarboxylic acid, a polycarboxylate, a polycarboxylic acid halide, a polycarbodiimide, and a polyisocyanate. It is preferable to select at least one cross-linking agent from the group consisting of the above cross-linking agents. In such a case, a functional group, which may prompt a cross-linking reaction with the selected cross-linking agent, is selected as the functional group.

At least one functional group and at least one cross-linking agent are preferably selected respectively from the group consisting of the functional groups exemplified as the preferable functional groups and the group consisting of the cross-linking agents exemplified as the preferable cross-linking agents, so that a combination of the functional group and the cross-linking agent may prompt a cross-linking reaction.

Particularly preferable examples of the functional group include —COOR (where R represents a substituted or unsubstituted hydrocarbon group). A carboxyl group can be relatively easily introduced into a carbon nanotube, and the resultant substance (carbon nanotube carboxylic acid) has high reactivity. Therefore, it is relatively easy to esterify the substance to convert its functional group into —COOR (where R represents a substituted or unsubstituted hydrocarbon group) after the formation of the substance. The functional group easily prompts a cross-linking reaction, and is suitable for the formation of a structure.

In addition, a polyol can be exemplified as the cross-linking agent corresponding to the functional group. A polyol is cured by a reaction with —COOR (where R represents a substituted or unsubstituted hydrocarbon group) to easily form a robust cross-linked substance. Among polyols, each of glycerin, ethylene glycol, butenediol, hexynediol, hydroquinone, and naphthalenediol reacts with the above functional groups well. Moreover, each of glycerin, ethylene glycol, butenediol, hexynediol, hydroquinone, and naphthalenediol itself has high biodegradability, and applies a light load to an environment. Therefore, it is particularly preferable to use at least one polyol selected from the group consisting of the exemplified polyols as the cross-linking agent.

According to the method of manufacturing a composite of the present invention, in the case of the first method, it is possible to further add a solvent to the solution to be used in the supplying step which contains the plural carbon nanotubes to which the functional groups are bonded, and a cross-linking agent, and to supply the surface of the substrate with the resultant solution. The cross-linking agent can serve as the solvent depending on the kind of the cross-linking agent.

Further, a second method preferable for forming a cross-linked site is a method of chemically bonding plural functional groups together.

By doing so, the size of the cross-linked site for bonding the carbon nanotubes together becomes constant depending on the functional group to be bonded. Since a carbon nanotube has an extremely stable chemical structure, there is a low possibility that functional groups or the like excluding a functional group to modify the carbon nanotube are bonded to the carbon nanotube. In the case where the functional groups are chemically bonded together, the designed structure of the cross-linked site can be obtained, thereby providing a homogeneous carbon nanotube structure.

Furthermore, the functional groups are chemically bonded together, so that the length of the cross-linked site between the carbon nanotubes can be shorter than that in the case where the functional groups are cross-linked together with a cross-linking agent. Therefore, the carbon nanotube structure is dense, and tends to readily produce an effect peculiar to a carbon nanotube.

A reaction for chemically bonding the functional groups is particularly preferably any one of condensation, a substitution reaction, an addition reaction, and an oxidative reaction.

In particular, in the method of manufacturing a composite of the present invention, a molecule containing the functional groups described later may be bonded to carbon nanotubes to chemically bond the functional groups at a functional group portion exemplified below to thereby construct a cross-linked site.

In the supplying step, an additive that forms the chemical bonding of the functional groups together may be additionally supplied to the surface of the substrate.

If the reaction for chemically bonding the functional groups together is dehydration condensation, a condensation agent is preferably added as the additive. Examples of the condensation agent that can be suitably used at this time include sulfuric acid, N-ethyl-N'-(3-dimethylaminopropyl) carbodiimide, and dicyclohexyl carbodiimide. It is preferable to select at least one condensation agent from the group consisting of the above condensation agents.

Examples of the functional groups to be used in dehydration condensation include —COOR (where R represents a substituted or unsubstituted hydrocarbon group), —COOH, —COX (where X represents a halogen atom), —OH, —CHO, and —NH$_2$. It is preferable to select at least one functional group from the group consisting of the above functional groups.

Particularly preferable as the functional group to be used in dehydration condensation is —COOH. Introduction of a carboxyl group into carbon nanotubes is relatively easy, and the resultant substance (carbon nanotube carboxylic acid) has high reactivity. Therefore, functional groups for forming a network structure can be easily introduced into plural sites of one carbon nanotube. Moreover, the functional group is suitable for formation of a carbon nanotube structure because the functional group easily prompts dehydration condensation.

If the reaction for chemically bonding the functional groups together is a substitution reaction, a base is preferably added as the additive. Examples of the base that can be suitably used at this time include sodium hydroxide, potassium hydroxide, pyridine, and sodium ethoxide. It is preferable to select at least one base from the group consisting of the above bases. Examples of the functional group to be used at this time include —NH$_2$, —X (where X represents a halogen atom), —SH, —OH, —OSO$_2$CH$_3$, and —OSO$_2$(C$_6$H$_4$)CH$_3$. It is preferable to select at least one functional group from the group consisting of the above functional groups.

If the reaction for chemically bonding the functional groups together is an addition reaction, the functional groups are preferably —OH and/or —NCO.

If the reaction for chemically bonding the functional groups together is an oxidative reaction, the functional groups are preferably —SH. Although the additive is not necessarily required in this case, an oxidative reaction accelerator is preferably added as the additive. An example of an oxidative reaction accelerator that can be suitably added is iodine.

According to the method of manufacturing a composite of the present invention, in the case of the second method, it is possible to prepare a supply solution (cross-linking solution) to be used in the supplying step which contains the plural carbon nanotubes to which the functional groups are bonded, and the additive as required in a solvent and to supply the surface of the substrate with the resultant solution.

The plural carbon nanotubes to be used in the method of manufacturing a composite of the present invention are each preferably a multi-wall carbon nanotube having a high electrical conductivity. This is because when functional groups are bonded, an inner graphene sheet structure destroys to a small extent, and thus the characteristics of a carbon nanotube hardly deteriorate.

According to the present invention, there is provided a composite of a metal-containing material as a filler, which is excellent in mechanical strength and thermal conductivity, and a carbon nanotube structure having excellent electrical and physical characteristics, the composite having the combined advantages of both the metal-containing material and the carbon nanotube structure. According to the present invention, there is also provided a method of manufacturing the composite.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

Figure 1A:
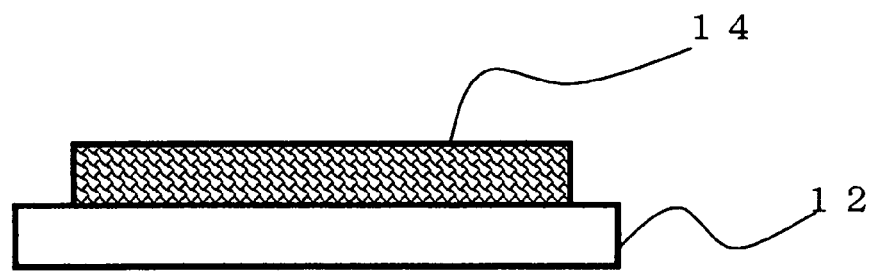
FIG. 1(a) is a schematic sectional diagram for explaining an example of a method of manufacturing a composite of the present invention, showing a state of the surface of a substrate after a cross-linking step.

Hereinafter, each of a composite and a method of manufacturing the same according to the present invention will be described in detail.

[Composite]

A composite of the present invention is featured by including a metal-containing material as a filler, and a carbon nanotube structure having a network structure in which plural carbon nanotubes are mutually cross-linked.

In the present invention, a carbon nanotube structure having a network structure in which plural carbon nanotubes are mutually cross-linked is used, so that CNTs are bonded via 1 unit of cross-linking agent to construct a network (NW) structure. As a result, a carbon nanotube network (CNT-NW) having uniform properties and a high density is formed, so that the thermal conductivity and mechanical characteristics become excellent. Since the carbon nanotube structure and a metal-containing material are mixed to form a composite, the mechanical strength and thermal or electrical conductive characteristics of the composite are improved.

In addition, a metal-containing material to be mixed with a carbon nanotube structure can be suitable for various applications through appropriate selection thereof. That is, the metal-containing material can be suitable for sliding members used in brakes, clutches, bearings, and so on of automobiles, two-wheel vehicles, railway wheels, air crafts, industrial machines, and so on. The metal-containing material can also be suitable for: substrates for semiconductor package; structural materials for space aircrafts; structural materials for general industry; heat-resistant materials such as a gas turbine; thermal machine materials such as a heat exchanger and a heat pump; electrical contact materials with good sliding characteristics; and the like. Examples of a metal-containing material suitable for those applications include Al, B, Mg, K, Ca, Ag, Cr, Co, Sm, Dy, Hg, Sn, Ce, Th, Pb, Hf, Ni, Nd, Ba, Bi, Pr, Be, Mn, La, Li, Rb, Zn, Mn, Fe, Cu, Y, and Cd, and an alloy, organometallic compound, metal salt, and metal oxide each containing at least one of them.

A method of mixing a carbon nanotube structure and a metal-containing material will be described in the section (Combining Step) of the manufacturing method of the present invention.

<Carbon Nanotube Structure>

In the present invention, the term "carbon nanotube structure" refers to a structure having a network structure in which plural carbon nanotubes are mutually cross-linked. Provided that a carbon nanotube structure can be formed in such a manner that carbon nanotubes are mutually cross-linked to construct a network structure, the carbon nanotube structure may be formed by any method. However, production according to a method of manufacturing a composite of the present invention to be described later is preferable because the production can be readily performed, can provide a low-cost and high-performance composite, and can readily perform uniformization and control of characteristics.

A first structure for the carbon nanotube structure constituting a part of a composite material manufactured according to the method of manufacturing a composite of the present invention to be described later is manufactured by curing a solution (cross-linking solution) containing carbon nanotubes having functional groups and a cross-linking agent that prompts a cross-linking reaction with the functional groups, to prompt a cross-linking reaction between the functional groups of the carbon nanotubes and the cross-linking agent, to thereby form a cross-linked site. Furthermore, a second structure for the carbon nanotube structure is manufactured by chemically bonding together functional groups of carbon nanotubes to form cross-linked sites.

Hereinafter, the carbon nanotube structure in the composite of the present invention will be described by way of examples of the manufacturing method. Unless otherwise stated, the structures of cross-linked sites are not considered.

(Carbon Nanotube)

Carbon nanotubes, which are the main component in the present invention, may be single-wall carbon nanotubes or multi-wall carbon nanotubes each having two or more layers. Whether one or both types of carbon nanotubes are used (and, if only one type is to be used, which type is selected) may be decided appropriately taking into consideration the use of the composite or the cost. However, the carbon nanotubes are each particularly preferably a multi-wall carbon nanotube having a high mechanical strength for exerting a function of a reinforcer intended for improving the mechanical strength. For exerting the other functions, the carbon nanotubes are also each preferably a multi-wall carbon nanotube having a high electrical conductivity. This is because when functional groups are bonded, an inner graphene sheet structure destroys to a small extent, and thus, the characteristics of a carbon nanotube hardly deteriorate.

Carbon nanotubes in the present invention include ones that are not exactly shaped like a tube, such as: a carbon nanohorn (a horn-shaped carbon nanotube whose diameter continuously increases from one end toward the other end) which is a variant of a single-wall carbon nanotube; a carbon nanocoil (a coil-shaped carbon nanotube forming a spiral when viewed in entirety); a carbon nanobead (a spherical bead made of amorphous carbon or the like with its center pierced by a tube); a cup-stacked nanotube; and a carbon nanotube with its outer periphery covered with a carbon nanohorn or amorphous carbon.

Furthermore, carbon nanotubes in the present invention may include ones that contain some substances inside, such as: a metal-containing nanotube which is a carbon nanotube containing metal or the like; and a peapod nanotube which is a carbon nanotube containing a fullerene or a metal-containing fullerene.

As described above, in the present invention, it is possible to employ carbon nanotubes of any form, including common carbon nanotubes, variants of the common carbon nanotubes, and carbon nanotubes with various modifications, without a problem in terms of reactivity. Therefore, the concept of "carbon nanotube" in the present invention encompasses all of the above.

Those carbon nanotubes are conventionally synthesized by a known method such as arc discharge, laser ablation, and CVD, and the present invention can employ any of the methods. However, arc discharge in a magnetic field is preferable from the viewpoint of synthesizing a highly pure carbon nanotube.

A diameter of carbon nanotubes used in the present invention is preferably 0.3 nm or more and 100 nm or less. If the diameter of the carbon nanotubes exceeds this upper limit, the synthesis becomes difficult and costly, which is not preferable. A more preferable upper limit of the diameter of the carbon nanotubes is 30 nm or less.

In general, the lower limit of the carbon nanotube diameter is about 0.3 nm from a structural standpoint. However, too small a diameter could undesirably lower the synthesis yield. It is therefore preferable to set the lower limit of the carbon nanotube diameter to 1 nm or more, more preferably 10 nm or more.

The length of carbon nanotubes used in the present invention is preferably 0.1 µm or more and 100 µm or less. If the length of the carbon nanotubes exceeds this upper limit, the synthesis becomes difficult or requires a special method raising cost, which is not preferable. On the other hand, if the length of the carbon nanotubes falls short of this lower limit, the number of cross-link bonding points per carbon nanotube is reduced, which is not preferable. A more preferable upper limit of the carbon nanotube length is 10 µm or less, and a more preferable lower limit of the carbon nanotube length is 1 µm or more.

If the purity of carbon nanotubes to be used is not high enough, it is desirable to raise the purity by refining the carbon nanotubes prior to preparation of the cross-linking solution. In the present invention, the higher the carbon nanotube purity, the better the result will be. Specifically, the purity is preferably 90% or higher, more preferably, 95% or higher. When the purity is low, cross-linking agents are cross-linked to carbon products such as amorphous carbon and tar, which are impurities. This could change the cross-linking distance between carbon nanotubes, possibly not providing the desired characteristics. A refining method for carbon nanotubes is not particularly limited, and any known refining method can be employed.

Such carbon nanotubes are used for the formation of a carbon nanotube structure with predetermined functional groups added to the carbon nanotubes. A preferable functional group to be added at this time varies depending on whether the carbon nanotube structure is formed by the first method or second method described above (a preferable functional group in the former case is referred to as "a functional group 1", and a preferable functional group in the latter case is referred to as "a functional group 2").

How functional groups are introduced into carbon nanotubes will be described in the section below titled (Method of Preparing Cross-linking Solution).

Hereinafter, components that can be used for the formation of a carbon nanotube structure will be described for the respective first and second methods.

(Case of First Method)

In the first method in which a cross-linked site is formed using a cross-linking agent, carbon nanotubes can have any functional group to be connected thereto, as long as functional groups selected can be added to the carbon nanotubes chemically and can prompt a cross-linking reaction with any type of cross-linking agent. Specific examples of such functional groups include —COOR, —COX, —MgX, —X (where X represents halogen), —OR, —NR$^1$R$^2$, —NCO, —NCS, —COO, —OH, —NH$_2$, —SH, —SO$_3$H, —R'CHOH, —CHO, —CN, —COSH, —SR, —SiR'$_3$ (In the above formulae, R, R$^1$, R$^2$, and R' each independently represent a substituted or unsubstituted hydrocarbon group. R, R$^1$, R$^2$, and R' are preferably each independently selected from the group consisting of —C$_n$H$_{2n-1}$, —C$_n$H$_{2n}$, and —C$_n$H$_{2n+1}$ (n represents an integer of 1 to 10 and —C$_n$H$_{2n-1}$, —C$_n$H$_{2n}$, and —C$_n$H$_{2n+1}$ may be substituted). Of those, a methyl group or an ethyl group is more preferable for each of R, R$^1$, R$^2$, and R'.). Note that the functional groups are not limited to those examples.

Of those, a selection of at least one functional group from the group consisting of —OH, —COOH, —COOR (In the formulae, R represents a substituted or unsubstituted hydrocarbon group. R is preferably selected from the group consisting of —$C_nH_{2n-1}$, —$C_nH_{2n}$, and —$C_nH_{2n+1}$ (n represents an integer of 1 to 10 and —$C_nH_{2n-1}$, —$C_nH_{2n}$, and —$C_nH_{2n+1}$ may be substituted.), —COX (where X represents a halogen atom), —$NH_2$, and —NCO is preferable. In that case, a cross-linking agent, which can prompt a cross-linking reaction with the selected functional group, is selected as the cross-linking agent.

In particular, —COOR(R is the same as that described above) is particularly preferable. This is because a carboxyl group can be relatively easily introduced into a carbon nanotube, because the resultant substance (a carbon nanotube carboxylic acid) can be easily introduced as a functional group by esterifying the substance, and because the substance has good reactivity with a cross-linking agent.

R in the functional group —COOR is a substituted or unsubstituted hydrocarbon group, and is not particularly limited. However, R is preferably an alkyl group having 1 to 10 carbon atoms, more preferably an alkyl group having 1 to 5 carbon atoms, and particularly preferably a methyl group or an ethyl group in terms of reactivity, solubility, viscosity, and ease of use as a solvent for a paint.

The amount of functional groups introduced cannot be determined uniquely because the amount varies depending on the length and thickness of a carbon nanotube, whether the carbon nanotube is of a single-wall type or a multi-wall type, the type of a functional group, the use of the composite, etc. From the viewpoint of the strength of the cross-linked substance obtained, namely, the strength of the structure, a preferable amount of functional groups introduced is large enough to add two or more functional groups to each carbon nanotube.

How functional groups are introduced into carbon nanotubes will be described in the section below titled [Method of Manufacturing Composite].

(Cross-linking Agent)

A cross-linking agent is an essential ingredient for the first method. Any cross-linking agent can be used as long as the cross-linking agent is capable of prompting a cross-linking reaction with the functional groups of the carbon nanotubes. In other words, the types of cross-linking agents that can be selected are limited to a certain degree by the types of the functional groups. Also, the conditions of curing (heating, UV irradiation, visible light irradiation, air setting, etc.) as a result of the cross-linking reaction are naturally determined by the combination of those parameters.

Specific examples of the preferable cross-linking agents include a polyol, a polyamine, a polycarboxylic acid, a polycarboxylate, a polycarboxylic acid halide, a polycarbodiimide, and a polyisocyanate. It is preferable to select at least one cross-lining agent from the group consisting of the above cross-linking agents. In that case, a functional group which can prompt a reaction with the cross-linking agent is selected as the functional group.

At least one functional group and one cross-linking agent are particularly preferably selected respectively from the group exemplified as the preferable functional group and the group exemplified as the preferable cross-linking agent, so that a combination of the functional group and the cross-linking agent may prompt a cross-linking reaction with each other. The following Table 1 lists the combinations of the functional group of the carbon nanotubes and the corresponding cross-linking agent, which can prompt a cross-linking reaction, along with curing conditions of the combinations.

TABLE 1

| Functional group of carbon nanotube | Cross-linking agent | Curing condition |
|---|---|---|
| —COOR | Polyol | heat curing |
| —COX | Polyol | heat curing |
| —COOH | Polyamine | heat curing |
| —COX | Polyamine | heat curing |
| —OH | Polycarboxylate | heat curing |
| —OH | Polycarboxylic acid halide | heat curing |
| —$NH_2$ | Polycarboxylic acid | heat curing |
| —$NH_2$ | Polycarboxylic acid halide | heat curing |
| —COOH | Polycarbodiimide | heat curing |
| —OH | Polycarbodiimide | heat curing |
| —$NH_2$ | Polycarbodiimide | heat curing |
| —NCO | Polyol | heat curing |
| —OH | Polyisocyanate | heat curing |
| —COOH | Ammonium complex | heat curing |
| —COOH | Hydroquinone | heat curing |

*where R represents a substituted or unsubstituted hydrocarbon group

Of those combinations, preferable is the combination of —COOR (R represents a substituted or unsubstituted hydrocarbon group. R is preferably selected from the group consisting of —$C_nH_{2n-1}$, —$C_nH_{2n}$, and —$C_nH_{2n+1}$ (n represents an integer of 1 to 10 and —$C_nH_{2n-1}$, —$C_nH_{2n}$, and —$C_nH_{2n+1}$ may be substituted).) with good reactivity on a functional group side and a polyol, a polyamine, an ammonium complex, congo red, and cis-platin, which form a robust cross-linked substance with ease.

The term "polyol" in the present invention is a genetic name for organic compounds each having two or more OH groups. Of those, one having 2 to 10 (more preferably 2 to 5) carbon atoms and 2 to 22 (more preferably 2 to 5) OH groups is preferable in terms of cross-linkability, solvent compatibiity when an excessive amount thereof is charged, processability of waste liquid after a reaction by virtue of biodegradability (environmental suitability), yield of polyol synthesis, and so on. In particular, the number of carbon atoms is preferably lower within the above range because a gap between carbon nanotubes in the resultant structure can be narrowed to bring the carbon nanotubes into substantial contact with each other (to bring the carbon nanotubes close to each other). Specifically, glycerin and ethylene glycol are particularly preferable, and it is preferable to use one or both of glycerin and ethylene glycol as a cross-linking agent.

From another perspective, the cross-linking agent is preferably a not-self-polymerizable cross-linking agent. In addition to glycerin and ethylene glycol as examples of the polyols, butenediol, hexynediol, hydroquinone, and naphthalenediol are obviously not-self-polymerizable cross-linking agents. More generally, a prerequisite of the not-self-polymerizable cross-linking agent is to be without a pair of functional groups, which can prompt a polymerization reaction with each other, in itself. On the other hand, examples of a self-polymerizable cross-linking agent include one that has a pair of functional groups, which can prompt a polymerization reaction with each other (alkoxide, for example).

To form a carbon nanotube structure, it is sufficient to supply the surface of a substrate with the plural carbon nanotubes to which functional groups are bonded and the cross-linking agent (the supplying step in the method of manufacturing a composite of the present invention) and to chemically bond the functional groups together to form a cross-linked site (the cross-linking step in the method of manufacturing a composite of the present invention). In supplying the surface of the substrate with the plural carbon nanotubes to which functional groups are bonded and the cross-linking agent, it is preferable to supply the surface of the substrate with a solution (cross-linking solution) containing the carbon nanotubes, the cross-linking agent, and a solvent, in particular to apply the solution as an application liquid to the surface to form across-linked substance film because the composite of the present invention can be formed simply, at a low cost, and in a short time.

The carbon nanotube content in the cross-linking solution cannot be determined uniquely because the content varies depending on the length and thickness of a carbon nanotube, whether the carbon nanotube is of a single-wall type or a multi-wall type, the type and amount of a functional group of the carbon nanotube, the type and amount of a cross-linking agent or an additive for bonding functional groups together, the presence or absence of a solvent or other additive used and, if one is used, the type and amount of the solvent or additive, etc. The carbon nanotube content is desirably high enough to form a good structure after curing but not so high that applicability reduces.

Specifically, the ratio of carbon nanotubes to the total amount of cross-linking solution excluding the mass of the functional groups is about 0.01 to 10 g/l, preferably about 0.1 to 5 g/l, and more preferably about 0.5 to 1.5 g/l, although, as mentioned above, the ranges could be different if the parameters are different.

A solvent is added to the cross-linking solution when sufficient applicability is not achieved with the cross-linking agent alone. Any solvent can be used as long as the solvent is selected depending on the type of cross-linking agent used. Specific examples of such solvents include: organic solvents such as methanol, ethanol, isopropanol, n-propanol, butanol, methyl ethyl ketone, toluene, benzene, acetone, chloroform, methylene chloride, acetonitrile, diethyl ether, and tetrahydrofuran (THF); water; acidic aqueous solutions; and alkaline aqueous solutions. A solvent as such is added in an amount that is not particularly limited but determined appropriately by taking into consideration applicability.

(Case of Second Method)

In the second method in which a cross-linked site is formed by chemically bonding plural functional groups directly without using a cross-linking agent, any functional group can be selected for the carbon nanotubes without any particular limitation as long as the functional group can be chemically added to the carbon nanotubes and is capable of reacting with each other using any type of additive.

Specific examples of the functional group include —COOR, —COX, —MgX—, —X (where X represents a halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (In the above formulae, R, R$^1$, R$^2$, and R$^3$ each independently represent a substituted or unsubstituted hydrocarbon group. R, R$^1$, R$^2$, and R' are preferably each independently selected from the group consisting of —C$_n$H$_{2n-1}$, —C$_n$H$_{2n}$, and —C$_n$H$_{2n+1}$ (n represents an integer of 1 to 10 and —C$_n$H$_{2n-1}$, —C$_n$H$_{2n}$, and —C$_n$H$_{2n+1}$ may be substituted).) but are not limited to those.

A reaction for chemically bonding the functional groups together is particularly preferably dehydration condensation, a substitution reaction, an addition reaction, or an oxidative reaction. Examples of functional groups preferable for the respective reactions out of the above functional groups include: at least one functional group selected from the group consisting of —COOR (where R represents a substituted or unsubstituted hydrocarbon group, and is preferably selected from the group consisting of —C$_n$H$_{2n-1}$, —C$_n$H$_{2n}$, and —C$_n$H$_{2n+1}$ (n represents an integer of 1 to 10 and —C$_n$H$_{2n-1}$, —C$_n$H$_{2n}$, and —C$_n$H$_{2n+1}$ may be substituted)), —COOH, —COX (where X represents a halogen atom), —OH, —CHO, and —NH$_2$ for the dehydration condensation; at least one functional group selected from the group consisting of —NH$_2$, —X (where X represents a halogen atom), —SH, —OH, —OSO$_2$CH$_3$, and —OSO$_2$(C$_6$H$_4$)CH$_3$ for the substitution reaction; at least one functional group selected from the group consisting of —OH and —NCO for the addition reaction; and —SH for the oxidative reaction.

Further, it is also possible to bond a molecule, which partially contains those functional groups, with the carbon nanotubes to be chemically bonded at a preferable functional group portion exemplified above. Even in this case, a functional group with a large molecular weight to be bonded to the carbon nanotubes is bonded as intended, enabling control of a length of the cross-linked site.

In chemically bonding the functional groups together, an additive that can form the chemical bonding among the functional groups can be used. Any additive that is capable of causing the functional groups of the carbon nanotubes react with each other can be used as such an additive. In other words, the types of additives that can be selected are limited to a certain degree by the types of functional groups and of the reaction type. Also, the condition of curing (heating, UV irradiation, visible light irradiation, air setting, etc.) as a result of the reaction is naturally determined by the combination of those parameters.

If the reaction for chemically bonding the functional groups is dehydration condensation, a condensation agent is preferably added as the additive. Specific examples of preferable condensation agents include an acid catalyst and a dehydration condensation agent such as sulfuric acid, N-ethyl-N'-(3-dimethylaminopropyl)carbodiimide, and dicyclohexyl carbodiimide. It is preferable to select at least one condensation agent from the group consisting of the above. In that case, the functional groups, which can prompt a reaction among the functional groups with the help of the selected condensation agent, are selected as the functional group.

The functional groups to be used in dehydration condensation are preferably at least one functional group selected from the group consisting of —COOR (where R represents a substituted or unsubstituted hydrocarbon group), —COOH, —COX (where X represents a halogen atom), —OH, —CHO, and —NH$_2$.

Examples of a functional group particularly preferable for use in dehydration condensation include —COOH. Introduction of a carboxyl group into carbon nanotubes is relatively easy, and the resultant substance (carbon nanotube carboxylic acid) has high reactivity. Therefore, functional groups for forming a network structure can be easily introduced into plural sites of one carbon nanotube. Moreover, the functional group is suitable for formation of a carbon nanotube structure because the functional group is easily subjected to dehydration condensation. If the functional group to be used in dehydration condensation is —COOH, sulfuric acid, N-ethyl-N'-(3-dimethylaminopropyl) carbodiimide, and dicyclohexyl carbodiimide mentioned above are particularly preferable condensation agents.

If the reaction for chemically bonding the functional groups is a substitution reaction, abase is preferably added as the additive. Any base can be added without any particular limitation as long as the base is selected depending on the acidity of a hydroxyl group.

Specific preferable examples of the base include sodium hydroxide, potassium hydroxide, pyridine, and sodium ethoxide. It is preferable to select at least one base from the group consisting of the above bases. In that case, functional groups which can prompt a substitution reaction among the functional groups with the help of the selected base are selected as the functional group. In addition, the functional groups at this time are preferably at least one functional group selected from the group consisting of —$NH_2$, —X (where X represents a halogen atom), —SH, —OH, —$OSO_2CH_3$, and —$OSO_2(C_6H_4)CH_3$.

If the reaction for chemically bonding the functional groups is an addition reaction, an additive is not always necessary. The functional groups at this time are preferably —OH and/or —NCO.

If the reaction for chemically bonding the functional groups is an oxidative reaction, an additive is not always necessary either. However, an oxidative reaction accelerator is preferably added as the additive. An example of an oxidative reaction accelerator that can be suitably added is iodine. In addition, the functional groups at this time are preferably —SH.

It is preferable to select at least two functional groups to be added to carbon nanotubes from the group consisting of the functional groups exemplified as preferable functional groups so that a combination of the selected functional groups is capable of prompting a mutual reaction. Table 2 below lists functional groups (A) and (B) of carbon nanotubes capable of prompting a mutual cross-linking reaction and the corresponding reactions.

TABLE 2

| Cross-linked site | Functional group of carbon nanotube(A) | Functional group of carbon nanotube (B) | Reaction |
| --- | --- | --- | --- |
| —COOCO— | —COOH | —COOH | Dehydration condensation |
| —S—S— | —SH | —SH | Oxidative reaction |
| —O— | —OH | —OH | Dehydration condensation |
| —NH—CO— | —COOH | —$NH_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —$NH_2$ | Dehydration condensation |
| —NH— | —$NH_2$ | —X | Substitution reaction |
| —S— | —SH | —X | Substitution reaction |
| —O— | —OH | —X | Substitution reaction |
| —O— | —OH | —$OSO_2CH_3$ | Substitution reaction |
| —O— | —OH | —$OSO_2(C_6H_4)CH_3$ | Substitution reaction |
| —NH—COO— | —OH | —N=C=O | Addition reaction |

* where R represents a substituted or unsubstituted hydrocarbon group
* where X represents a halogen To form a carbon nanotube structure, it is sufficient to supply the surface of a substrate with the plural carbon nanotubes to which functional groups are bonded and the additive as required (the supplying step in the method of manufacturing a composite of the present invention) and to chemically bond the functional groups together to form a cross-linked site (the cross-linking step in the method of manufacturing a composite of the present invention) In supplying the surface of the substrate with the plural carbon nanotubes to which functional groups are bonded, it is preferable to supply the surface of the substrate with a solution (cross-linking solution) containing the carbon nanotubes, the additive as required, and a solvent, in particular to apply the solution as an application liquid to the surface to form a cross-linked substance film because the composite of the present invention can be formed simply, at a low cost, and in a short time.

A concept regarding the carbon nanotube content in the cross-linking solution is basically the same as that in the first method.

The content of the additive in the cross-linking solution varies depending on the type of additive (including whether the additive is self-polymerizable or not self-polymerizable). The content also varies depending on the length and thickness of a carbon nanotube, whether the carbon nanotube is of a single-wall type or a multi-wall type, the type and amount of a functional group of the carbon nanotube, the presence or absence of a solvent and other additive, and, if one is used, the type and amount of the solvent or other additive, etc. Therefore, the content cannot be determined uniquely. In particular, for example, glycerin or ethylene glycol can also provide characteristics of a solvent because a viscosity of glycerin or ethylene glycol is not so high, and thus an excessive amount of glycerin or ethylene glycol can be added.

A solvent is added to the cross-linking solution when sufficient applicability is not achieved with solely the cross-linking agent or the additive for bonding the functional groups. A solvent that can be employed is not particularly limited, and may be appropriately selected according to the type of cross-linking agents. Specific type and amount of a solvent are similar to those of the solvent described in the first method.

(Other Additive)

The cross-linking solution (including each of the first and second methods) may contain various additives including a viscosity modifier, a dispersant, and a cross-linking accelerator.

A viscosity modifier is added when sufficient applicability is not achieved with solely the cross-linking agent or the additive for bonding the functional groups. A viscosity modifier that can be employed is not particularly limited, and may be appropriately selected according to the type of cross-linking agent and the additive for bonding the functional groups. Specific examples of such viscosity modifiers include methanol, ethanol, isopropanol, n-propanol, butanol, methyl ethyl ketone, toluene, benzene, acetone, chloroform, methylene chloride, acetonitrile, diethyl ether, and tetrahydrofuran (THF).

Some of those viscosity modifiers have the function of a solvent when added in a certain amount, and it is meaningless to apparently distinguish viscosity modifiers from solvents. A viscosity modifier as such is added in an amount that is not particularly limited but determined by taking into consideration applicability.

A dispersant is added to the cross-linking solution in order to maintain the dispersion stability of the carbon nanotubes, the cross-linking agents, or the additive for bonding the functional groups in the cross-linking solution. Various known surfactants, water-soluble organic solvents, water, acidic aqueous solutions, alkaline aqueous solutions, etc. can be employed as a dispersant. However, a dispersant is not always necessary since components of the cross-linking solution have high dispersion stability by themselves. In addition, depending on the use of the final composite, the presence of impurities such as a dispersant in the cross-linking substance film may not be desirable. In such case, a dispersant is not added at all, or is added in a very small amount.

(Method of Preparing Cross-linking Solution)

A method of preparing a cross-linking solution is described next.

The cross-linking solution is prepared by mixing, as needed, carbon nanotubes that have functional groups with a cross-linking agent that prompts a cross-linking reaction with the functional groups or an additive that causes the functional groups to form chemical bonding among themselves (mixing step). The mixing step may be preceded by an addition step in which the functional groups are introduced into the carbon nanotubes.

If carbon nanotubes having functional groups are used as starting materials, the preparation starts with the mixing step. If normal carbon nanotubes themselves are used as starting materials, the preparation starts with the addition step.

(Addition Step)

The addition step is a step of introducing desired functional groups into carbon nanotubes. How functional groups are introduced varies depending on the type of functional group and cannot be uniquely determined. One method is to add a desired functional group directly, and another method is to introduce a functional group that is easy to attach and then substitute the whole functional group or a part thereof or attach a different functional group to the former functional group in order to obtain the target functional group.

Still another method is to apply a mechanochemical force to a carbon nanotube to break or modify a small portion of a graphene sheet on the surface of the carbon nanotube and to introduce various functional groups into the broken or modified portion.

Furthermore, functional groups can be introduced into cup-stacked carbon nanotubes, which have many defects on the surface upon manufacture, and carbon nanotubes that are formed by vapor phase growth with relative ease. On the other hand, carbon nanotubes each having a perfect graphene sheet structure exert the carbon nanotube characteristics more effectively and the characteristics are easily controlled. Consequently, it is particularly preferable to use a multi-wall carbon nanotube so that defects are formed as many as appropriate on its outermost layer to bond functional groups for cross-linking while the inner layers having less structural defects exert the carbon nanotube characteristics.

There is no particular limitation on the addition step and any known method can be employed. Various addition methods disclosed in JP2002-503204 A maybe employed in the present invention depending on the purpose.

A description is given on a method of introducing —COOR (In the formula, R represents a substituted or unsubstituted hydrocarbon group. R is preferably selected from the group consisting of —$C_nH_{2n-1}$, —$C_nH_{2n}$, and —$C_nH_{2n+1}$ (n represents an integer of 1 to 10 and —$C_nH_{2n-1}$, —$C_nH_{2n}$, and —$C_nH_{2n+1}$ may be substituted), a particularly desirable functional group among the functional groups listed in the above. To introduce —COOR (where R is the same as that described above) into carbon nanotubes, carboxyl groups may be (i) added to the carbon nanotubes once, and then (ii) esterified.

(i) Addition of Carboxyl Group

To introduce carboxyl groups into carbon nanotubes, carboxyl groups are refluxed together with an acid having an oxidizing effect. This operation is relatively easy and is preferable since carboxyl groups with high reactivity can be attached to carbon nanotubes. A brief description of the operation is given below.

Examples of an acid having an oxidizing effect include concentrated nitric acid, hydrogen peroxide solution, a mixture of sulfuric acid and nitric acid, and aqua regia. When concentrated nitric acid is used, in particular, the concentration is preferably 5 mass % or higher, more preferably, 60 mass % or higher.

A normal reflux method can be employed. The reflux temperature is preferably close to the boiling point of the acid used. When concentrated nitric acid is used, for instance, the temperature is preferably set to 120 to 130° C. The reflux preferably lasts for 30 minutes to 20 hours, more preferably, for 1 hour to 8 hours.

Carbon nanotubes to which carboxyl groups are attached (a carbon nanotube carboxylic acid) are produced in the reaction liquid after the reflux. The reaction liquid is cooled down to room temperature and then is subjected to a separation operation or washing as necessary, thereby obtaining the target carbon nanotube carboxylic acid.

(ii) Esterification

The target functional group —COOR (where R represents a substituted or unsubstituted hydrocarbon group and a preferable R is such as that described above) can be introduced by adding an alcohol to the obtained carbon nanotube carboxylic acid and dehydrating the mixture for esterification.

The alcohol used for the esterification is determined according to R in the formula of the functional group. That is, if R is $CH_3$, the alcohol is methanol, and if R is $C_2H_5$, the alcohol is ethanol.

A catalyst is generally used in the esterification, and a conventionally known catalyst such as sulfuric acid, hydrochloric acid, or toluenesulfonic acid can be used in the present invention. The use of sulfuric acid as a catalyst is preferable from a view of not prompting a side reaction in the present invention.

The esterification may be conducted by adding an alcohol and a catalyst to a carbon nanotube carboxylic acid and refluxing the mixture at an appropriate temperature for an appropriate time period. A temperature condition and a time period condition in this case depend on type of catalyst, type of alcohol, or the like and cannot be uniquely determined, but a reflux temperature is preferably close to the boiling point of the alcohol used. The reflux temperature is preferably in the range of 60 to 70° C. for methanol, for example. Further, a reflux time period is preferably in the range of 1 to 20 hours, more preferably in the range of 4 to 6 hours.

A carbon nanotube with the functional group —COOR (where R represents a substituted or unsubstituted hydrocarbon group and a preferable R is such as that described above) added can be obtained by separating a reaction product from a reaction liquid after esterification and washing the reaction product as required.

(Mixing Step)

The mixing step is a step of mixing, as required, carbon nanotubes which contain functional groups with a cross-linking agent prompting a cross-linking reaction with the functional groups or an additive for bonding the functional groups, to thereby prepare the cross-linking solution. In the mixing step, other additives described in the aforementioned section titled (Other Additive) are mixed, in addition to the carbon nanotubes containing functional groups and the cross-linking agents. Then, an amount of a solvent or a viscosity modifier is preferably adjusted considering applicability, to thereby prepare the cross-linking solution just before supply (application) to the substrate.

Simple stirring with a spatula and stirring with a stirrer of a stirring blade type, a magnetic stirrer, and a stirring pump may be used. However, to achieve higher degree of uniformity in dispersion of the carbon nanotubes to enhance storage stability while fully extending a network structure by cross-linking of the carbon nanotubes, an ultrasonic disperser or a homogenizer may be used for powerful dispersion. However, when using a stirring device with a strong shear force of stirring such as a homogenizer, there arises a risk of cutting and damaging the carbon nanotubes in the solution, thus the device may be used for a very short time period.

A carbon nanotube structure is formed by supplying (applying) the cross-linking solution described above to the substrate surface and curing the substrate. A supplying method and a curing method are described in detail in the section below titled[Method of Manufacturing Composite].

The carbon nanotube structure in the present invention is in a state where carbon nanotubes are networked. In detail, the carbon nanotube structure is cured into a matrix form, carbon nanotubes are connected to each other via cross-linked sites, and characteristics of a carbon nanotube itself such as high electron- and hole-transmission characteristics can be exerted sufficiently. In other words, the carbon nanotube structure has carbon nanotubes that are tightly connected to each other, contains no other binders and the like, and is thus composed substantially only of carbon nanotubes, so that characteristics peculiar to a carbon nanotube are fully used.

A thickness of the carbon nanotube structure of the present invention can be widely selected from being very thin to being thick according to an application. Lowering a content of the carbon nanotubes in the cross-linking solution used (simply, lowering the viscosity by diluting) and applying the cross-linking solution as a thin film provides a very thin structure. Similarly, raising a content of the carbon nanotubes provides a thick structure. Further, repeating the application provides an even thicker structure. Formation of a very thin structure from a thickness of about 10 nm is possible, and formation of a thick structure without an upper limit is possible through recoating. A possible film thickness with one coating is about 5 μm. Further, a desired shape of the structure can be obtained by injecting the cross-linking solution, in which a content or the like is adjusted, to a mold and cross-linking.

In forming the carbon nanotube structure according to the first method, a site where the carbon nanotubes are mutually cross-linked, that is, the cross-linked site formed by a cross-linking reaction between the functional groups of the carbon nanotubes and the cross-linking agents has a cross-linking structure. In the cross-linking structure, residues of the functional groups remaining after the cross-linking reaction are connected together with a connecting group, which is a residue of the cross-linking agent remaining after the cross-linking reaction.

As described, the cross-linking agent, which is a component of the cross-linking solution, is preferably not self-polymerizable. If the cross-linking agent is not self-polymerizable, the carbon nanotube structure finally manufactured would be constructed from a residue of only one cross-linking agent. The gap between the carbon nanotubes to be cross-linked can be controlled to a size of a residue of the cross-linking agent used, thereby providing a desired network structure of the carbon nanotubes with high duplicability. Further, plural cross-linking agents are not present between the carbon nanotubes, thus enabling an enhancement of an actual density of the carbon nanotubes in the carbon nanotube structure. Further, reducing a size of a residue of the cross-linking agent can extremely narrow a gap between each of the carbon nanotubes both electrically and physically (carbon nanotubes are substantially in direct contact with each other).

When forming the carbon nanotube structure with a cross-linking solution prepared by selecting a single functional group of the carbon nanotubes and a single not-self-polymerizable cross-linking agent, the cross-linked site of the structure will have the same cross-linking structure (Example 1). Further, even when forming the carbon nanotube structure with a cross-linking solution prepared by selecting plural types of functional groups of the carbon nanotubes and/or plural types of not-self-polymerizable cross-linking agents, the cross-linked sites of the structure will mainly have a cross-linking structure based on a combination of the functional group and the not-self-polymerizable cross-linking agent mainly used (Example 2).

On the contrary, when forming the carbon nanotube structure with a cross-linking solution prepared by selecting self-polymerizable cross-linking agents, without regard to whether the functional groups of the carbon nanotubes and the cross-linking agents are of single or plural types, the cross-linked sites in the carbon nanotube structure where carbon nanotubes are cross-linked together will not mainly have a specific cross-linking structure. This is because the cross-linked sites will be in a state where numerous connecting groups with different connecting (polymerization) numbers of the cross-linking agents coexist.

In other words, by selecting not-self-polymerizable cross-linking agents, the cross-linked sites, where the carbon nanotubes of the carbon nanotube structure cross-link together, have a mainly identical cross-linking structure because a residue of only one cross-linking agent bonds with the functional groups. "Mainly identical" here is a concept including a case with all of the cross-linked sites having an identical cross-linking structure as described above (Example 1), as well as a case with the cross-linking structure based on a combination of the functional group and the not-self-polymerizable cross-linking agent mainly used becomes a main structure with respect to the total cross-linked sites as described above (Example 2).

When referring to "mainly identical", a "ratio of identical cross-linked sites" with respect to the total cross-linked sites will not have a uniform lower limit defined. The reason is that a case of imparting a functional group or a cross-linking structure with an aim different from formation of a carbon nanotube network may be assumed, for example. However, in order to actualize high electrical or physical characteristics peculiar to carbon nanotubes with a strong network, a "ratio of identical cross-linked sites" with respect to the total cross-linked sites is preferably 50% or more, more preferably 70% or more, further more preferably 90% or more, and most preferably 100%, based on numbers. Those number ratios can be determined through, for example, a method of measuring an intensity ratio of an absorption spectrum corresponding to the cross-linking structure with an infrared spectrum.

As described, if a carbon nanotube structure has the cross-linked site with a mainly identical cross-linking structure where carbon nanotubes cross-link together, a uniform network of the carbon nanotubes can be formed in a desired state. In addition, the carbon nanotube network can be constructed with homogeneous, satisfactory, and expected electrical or physical characteristics and high duplicability.

Further, the connecting group preferably contains hydrocarbon for a skeleton thereof. "Hydrocarbon for a skeleton" here refers to a main chain portion of the connecting group consisting of hydrocarbon, the main portion of the connecting group contributing to connecting residues together of the functional groups of carbon nanotubes to be cross-linked remaining after a cross-linking reaction. A side chain portion, where hydrogen of the main chain portion is substituted by another substituent, is not considered. Obviously, it is more preferable that the whole connecting group consists of hydrocarbon.

The number of carbon atoms in the hydrocarbon is preferably 2 to 10, more preferably 2 to 5, and further more preferably 2 to 3. The connecting group is not particularly limited as long as the connecting group is divalent or more.

In the cross-linking reaction of the functional group —COOR (where R represents a substituted or unsubstituted hydrocarbon, and a preferable R is such as that described above) and ethylene glycol, exemplified as a preferable combination of the functional group of carbon nanotubes and the cross-linking agent, the cross-linked site, where plural carbon nanotubes cross-link to each other, becomes —COO($CH_2$)$_2$OCO—.

Further, in the cross-linking reaction of the functional group —COOR (where R represents a substituted or unsubstituted hydrocarbon, and a preferable R is such as that described above) and glycerin, the cross-linked site, where plural carbon nanotubes cross-link to each other, becomes —COO$CH_2$CHOH$CH_2$OCO— or —COO$CH_2$CH(OCO—)$CH_2$OH if two OH groups contribute in the cross-link, and the cross-linked site becomes —COO$CH_2$CH(OCO—)$CH_2$OCO— if three OH groups contribute in the cross-link.

As has been described, the composite of the present invention in forming a carbon nanotube structure according to the first method has a carbon nanotube structure having a network structure that is composed of plural carbon nanotubes connected to each other through plural cross-linked sites. Thus, contact or arrangement of carbon nanotubes remains stable, unlike a mere carbon nanotube dispersion film. Therefore, characteristics that are peculiar to carbon nanotubes including high carrier (such as an electron or a hole)- and heat-transmission characteristics, physical characteristics such as thermal conductivity and toughness, and light absorption characteristics can be stably used.

On the other hand, in forming the carbon nanotube structure according to the second method, a site where the plural carbon nanotubes are mutually cross-linked, that is, a cross-linked site formed by a cross-linking reaction among the functional groups of the plural carbon nanotubes has a cross-linking structure in which residues of the functional groups remaining after a cross-linking reaction are connected to each other. In this case as well, the carbon nanotube structure has carbon nanotubes connected in a matrix form via a cross-linked portion. Therefore, characteristics of carbon nanotubes, such as high electron- and hole-transmission characteristics, are easily obtained. That is, the carbon nanotube structure has carbon nanotubes that are tightly connected together, and contains no other binders. Therefore, it can be said that the carbon nanotube structure is composed substantially only of carbon nanotubes.

Further, the cross-linked sites are formed by directly reacting the functional groups, thus enabling an enhancement of the actual carbon nanotube density of the carbon nanotube structure. If the functional groups are reduced in size, the carbon nanotubes can be brought very close to each other both electrically and physically, and characteristics of a carbon nanotube itself can be more easily obtained.

Further, cross-linked sites are formed by chemical bonding of the functional groups together, thus the carbon nanotube structures mainly have the same cross-linking structure. Therefore, a uniform network of carbon nanotubes can be formed into a desired state. Therefore, homogeneous, satisfactory, and expected electrical and physical carbon nanotube characteristics can be obtained with high duplicability.

A layer except the carbon nanotube structure may be formed in the composite of the present invention.

For example, placing an adhesive layer between the surface of the substrate and the carbon nanotube structure for enhancing adhesiveness therebetween is preferable for improving the adhesive strength of the carbon nanotube structure. A method of forming an adhesive layer and other details will be explained in the section titled[Method of Manufacturing Composite].

As described above, a thick protective layer covering the entire surface of a carbon nanotube structure enables the carbon nanotube structure to be used as a structural material. A carbon nanotube structure forms a network in which plural carbon nanotubes are cross-linked, and the network functions as a reinforcer. Therefore, the carbon nanotube structure can serve as a structural material having an extremely high mechanical strength as compared to general fiber-reinforced plastics (FRP) where fillers are randomly arranged.

A specific shape and the like of the above-described composite of the present invention will be made clear in the following sections titled[Method of Manufacturing Composite] and [Other Aspects of Composite], and Examples. Note that the descriptions below show merely examples and are not to limit specific aspects of the composite of the present invention.

[Method of Manufacturing Composite]

A method of manufacturing a composite of the present invention is a method suitable for manufacturing the composite of the present invention described above. Specifically, the method includes the steps of: (A) supplying the surface of a substrate with a solution (cross-linking solution) containing plural carbon nanotubes to which plural functional groups are bonded; (B) mutually cross-linking the plural carbon nanotubes to construct a network structure by curing the solution after the supply, thereby forming a carbon nanotube structure; and (C) mixing the carbon nanotube structure and a metal-containing material. As described above, the formulation of the cross-linking solution in the (A) supplying step according to the first method is different from that according to the second method.

Hereinafter, details of the respective steps in the method of manufacturing a composite of the present invention will be described with reference to FIGS. 1(a) to 1(d). FIGS. 1(a) to 1(d) are each a schematic sectional diagram of the surface of a substrate during a manufacturing step for explaining an example (C-A-2 to be described later) of the method of manufacturing a composite of the present invention. In the figures, reference numerals 12 and 12' each denote a board-like substrate; 14, a carbon nanotube structure; 15, an organometallic compound solution; 15', a metal-containing material; and 16, a carbon nanotube structure composite film.

In the following description, an example according to the first method is given. It is needless to say that the present invention is not limited to the example.

(A) Supplying Step

In the present invention, the "supplying step" is a step of supplying the surface of the substrate with a cross-linking solution containing carbon nanotubes having functional groups. There is no need to supply the entire surface of the substrate with the cross-linking solution in the supplying step. FIG. 1(a) is a schematic sectional diagram showing a state of the surface of the substrate after the (A) supplying step.

In this step, the above-described cross-linking solution may be simply supplied to the surface of the substrate. Application provides a layer for forming a carbon nanotube structure simply, at a low cost, and in a short time.

The application method is not particularly limited, and any method can be adopted from a wide range to supply the cross-linking solution. For example, the solution may be simply dropped or spread with a squeegee or may be applied by a common application method. Examples of common application methods include spin coating, wire bar coating, cast coating, roll coating, brush coating, dip coating, spray coating, and curtain coating.

The substrate, the carbon nanotubes having functional groups, the cross-linking agent, the additive, and the contents of the cross-linking solution are as described in the section[Composite].

(B) Cross-linking Step

In the present invention, the "cross-linking step" is for forming the carbon nanotube structure by mutually cross-linking the functional groups of the carbon nanotubes after the supply through chemical bonding of the functional groups together to form a cross-linked site. If the supplying step includes application of a cross-linking solution, the step is for forming a carbon nanotube structure layer having a network structure in which the plural carbon nanotubes are mutually cross-linked by curing the cross-linking solution after application. The cross-linking solution must be cured in the cross-linking step to form the carbon nanotube structure in all the desired regions but, as long as the desired regions are included, there is no need to cure all of the cross-linking solution supplied to the surface of the substrate.

An operation carried out in the cross-linking step is naturally determined according to the combination of the functional groups with the cross-linking agent as shown in Table 1 above, for example. If a combination of thermosetting functional groups and cross-linking agent is employed, the applied solution is heated by various heaters or the like. If a combination of functional groups that are cured by ultraviolet rays is employed, the applied solution is irradiated with a UV lamp or left under the sun. If a combination of air setting functional groups and cross-linking agent is employed, it is sufficient to let the applied solution stand still. "Letting the applied solution stand still" is deemed as one of the operations that may be carried out in the cross-linking step of the present invention.

Heat curing (polyesterification through an ester exchange reaction) is conducted for the case of a combination of a carbon nanotube, to which the functional group —COOR (where R represents a substituted or unsubstituted hydrocarbon group and a preferable R is such as that described above) is added, and a polyol (among them, glycerin and/or ethylene glycol). Heating causes an ester exchange reaction between —COOR of the esterified carbon nanotube carboxylic acid and R'—OH (where R' represents a substituted or unsubstituted hydrocarbon group, and is preferably selected from the group consisting of —$C_nH_{2n-1}$, —$C_nH_{2n}$, and —$C_nH_{2n+1}$ (n represents an integer of 1 to 10 and —$C_nH_{2n-1}$, —$C_nH_{2n}$, and —$C_nH_{2n+1}$ may be substituted)) of a polyol. As the reaction progresses multilaterally, the carbon nanotubes are cross-linked until a network of carbon nanotubes connected to each other constructs a carbon nanotube structure 14 as shown in FIG. 1(a).

To give an example of conditions preferable for the above combination, the heating temperature is specifically set to preferably 50 to 500° C., more preferably 120 to 200° C. The heating time period is specifically set to preferably 1 minute to 10 hours, more preferably 1 hour to 2 hours.

(C) Combining Step

The mixing step in the present invention is a step of mixing a carbon nanotube structure and a metal-containing material to form a composite of a carbon nanotube and the metal-containing material. The resultant composite of the present invention is structured such that the carbon nanotube structure is filled with the metal-containing material.

The term "mixing" in the present invention means molding one body (structure) by integrating dissimilar materials while maintaining their properties. An aggregate of materials constituting the body (structure) thus obtained is referred to as a "composite".

Meanwhile, the term "filled" in the present invention means a state where a block (carbon nanotube structure in the present invention) having cavities is integrated with other solid material (metal-containing material in the present invention) to fill the cavities. In the present invention, it is not required that the cavities be completely filled with the other solid material. That is, some cavities may remain in the block. It is needless to say that the cavities are desirably filled at as high a density as possible to desirably realize various characteristics of the composite of the present invention in a high level.

The other solid material can be in various states. For example, the solid material may completely surround the outside of the block. Alternatively, the solid material may be present only in the cavities of the block. The solid material may be in a state where part of the block is exposed. The solid material may surround the whole or part of the block together with a substrate.

A method of mixing a carbon nanotube structure and a metal-containing material can be appropriately selected from various methods depending on a metal-containing material to be used. Examples of such methods include: a method in which a molten metal such as solder is directly applied to a carbon nanotube structure; a method in which an organometallic compound solution is applied to a carbon nanotube structure, followed by calcining; a method in which a powdered metal is applied to a carbon nanotube structure, followed by sintering; a method in which a powdered metal is applied to a carbon nanotube structure, followed by binding through pressurization; and a method in which another precursor (derivative) of a metal-containing material is applied to a carbon nanotube structure, followed by appropriate treatment depending on the type of precursor to combine the metal-containing material.

Various metals can be applied as they are as the molten metal. Examples of a metal suitable for the corresponding method include Al, In, Ga, Sn—Pb, and Sn—Ag.

Any solution of an organometallic compound capable of mixing the metal-containing material through calcinating can be applied as the organometallic compound solution.

Specific examples of such an organometallic compound include alkoxides of Si, Ti, Cu, Co, Al, In, Zn, and Zr.

Various metals can be applied as they are as the powdered metal. Examples of a metal suitable for sintering in the corresponding method include Al, In, Sn, and Ni. Examples of a metal suitable for binding through pressurization include Al, Cr, and Ni.

Furthermore, examples of another precursor for a metal-containing material include aluminum dihydrogen phosphate, magnesium dihydrogen phosphate, and manganese dihydrogen phosphate (which can be oxidized into metal salt).

Instead of supplying the carbon nanotube structure with a metal material (including an organometallic compound and another precursor of a metal-containing material, the same holds true for the following description), a composite can also be produced according to an approach corresponding to the metal material. For example, the carbon nanotube structure is separated from the substrate and mixed into the metal material, and the resultant mixed solution is applied to another substrate surface or the same substrate surface. Hereinafter, the manufacturing method advancing as shown in FIGS. 1(a) to 1(d) will be described by using the case adopting the above approach as an example.

Figure 1B:
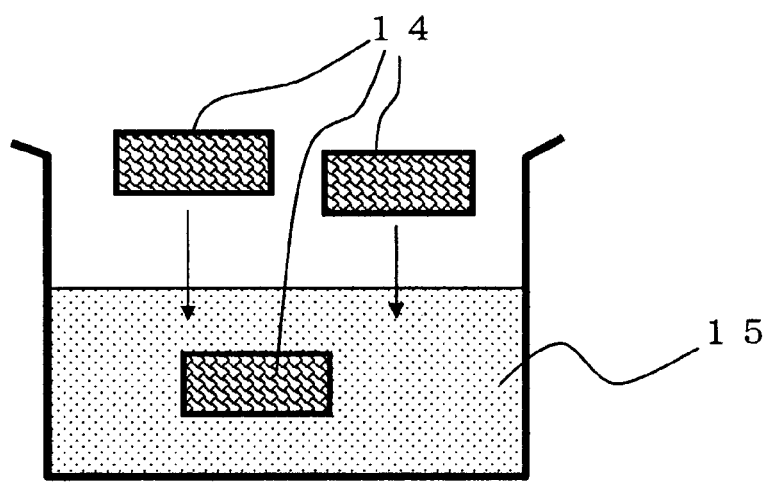
FIG. 1(b) is a schematic diagram for explaining the example of the method of manufacturing a composite of the present invention, showing a state where a carbon nanotube structure is immersed in an organometallic solution.

FIG. 1(b) is a schematic diagram showing a state where the carbon nanotube structure separated from the substrate is mixed into a metal material. FIG. 1(b) shows how the carbon nanotube structure 14 is immersed in the organometallic compound solution 15. The carbon nanotube structure 14 of FIG. 1(b) is obtained by scraping the carbon nanotube structure 14 formed on the surface of the substrate 12' of FIG. 1(a) off the surface by physical means. Examples of physical means for such scraping off include: scraping off with a spatula or the like; and scraping off by warping a flexible substrate after applying the carbon nanotube structure to the substrate.

Figure 1C:
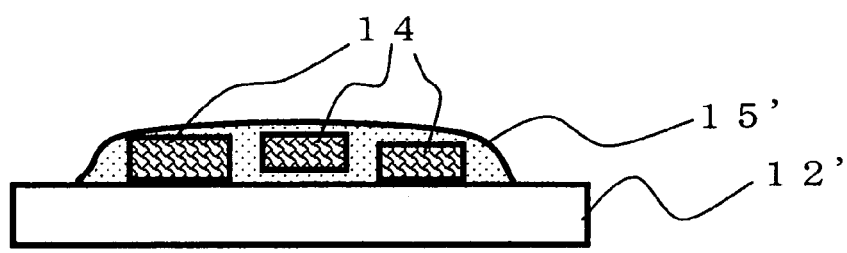
FIG. 1(c) is a schematic sectional diagram for explaining the example of the method of manufacturing a composite of the present invention, showing a state where a mixed solution of the carbon nanotube structure and the organometallic solution of FIG. 1(b) is applied onto a substrate.

The mixed solution of the metal material and the carbon nanotube structure thus obtained is applied to another substrate surface or the same substrate surface. FIG. 1(c) is a schematic sectional diagram showing a state where the mixed solution composed of the carbon nanotube structure 14 and the organometallic compound solution 15 is applied to the surface of a substrate 12' different from the above substrate.

The resultant is then subjected to treatment in accordance with the organometallic compound solution 15 as the applied metal material such as heat treatment to combine the applied film. As a result, as shown in FIG. 1(d), the carbon nanotube structure composite film 16 composed of the carbon nanotube structure 14 and the metal-containing material 15' is formed.

Figure 1D:
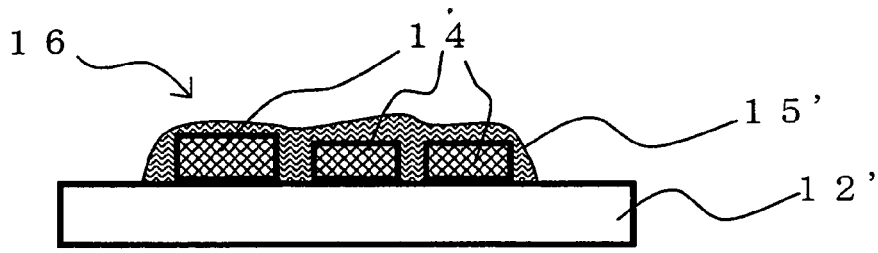
FIG. 1(d) is a schematic sectional diagram for explaining the example of the method of manufacturing a composite of the present invention, showing a composite of the present invention obtained by mixing the applied film of FIG. 1(c)

As described above, a composite of the aspect shown in the schematic sectional diagram of FIG. 1(d) can be manufactured.

Any substrate can be used for the substrates 12 and 12' without any particular limitations. However, a substrate to be used desirably has a smooth surface.

Specific examples of a substrate material include a silicon wafer, quartz glass, sapphire, and a fluorine resin (for example, Teflon (registered trademark)).

In particular, if a substrate itself serves as a component of a composite to be finally obtained like the substrate 12 in this example or like a substrate on which a carbon nanotube structure is formed, the substrate being used as it is for constituting a composite, a substrate material may be selected depending on the applications, requisite performance, requisite characteristics, and the like of the composite.

In this example, the substrates (12 and 12') are board-like ones. However, the present invention is not limited to a board-like substrate, and substrates of various shapes can be used. If a substrate itself serves as a component of a composite to be finally obtained, the shape of the substrate used may be designed depending on the applications, requisite performance, requisite characteristics, and the like of the composite.

(D) Other Step

Following the above respective steps enables manufacture of the composite of the present invention. The method of manufacturing a composite of the present invention can include other steps.

For instance, the method preferably includes a surface treatment step of treating the surface of the substrate prior to the supplying step. The surface treatment step is performed for the purpose of: enhancing adsorbing property of the cross-linking solution to be supplied; enhancing adhesiveness between the carbon nanotube structure to be formed as an upper layer and the surface of the substrate; cleaning the surface of the substrate; adjusting the electrical conductivity of the surface of the substrate; or the like.

Examples of the surface treatment step to be performed for the purpose of enhancing adsorbing property of a cross-linking solution include treatment with a silane coupling agent (for example, aminopropyltriethoxysilane or γ-(2-aminoethyl)aminopropyltrimethoxysilane). Of those, surface treatment with aminopropyltriethoxysilane has been extensively performed and is also suitable for the surface treatment step in the present invention. The surface treatment with aminopropyltriethoxysilane has been conventionally used for surface treatment of mica used in a substrate for AFM observation of DNA as shown in a document such as Y. L. Lyubchenko et al., Nucleic Acids Research, 1993, vol. 21, p. 1117-1123.

[Other Aspects of Composite]

Figure 2A:
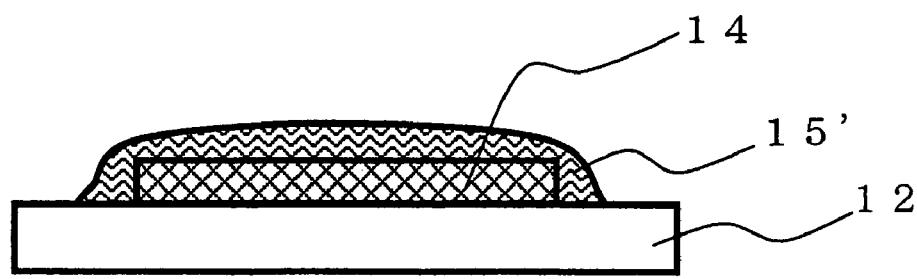
FIG. 2(a) is a schematic sectional diagram exemplifying an aspect of the composite of the present invention.
Figure 2B:
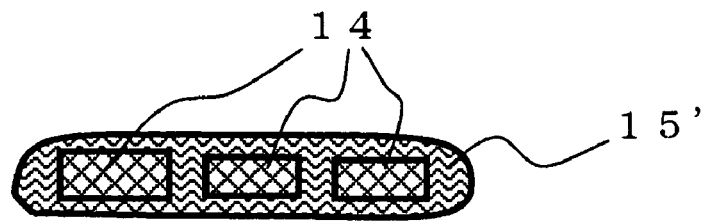
FIG. 2(b) is a schematic sectional diagram exemplifying another aspect of the composite of the present invention.
Figure 2C:
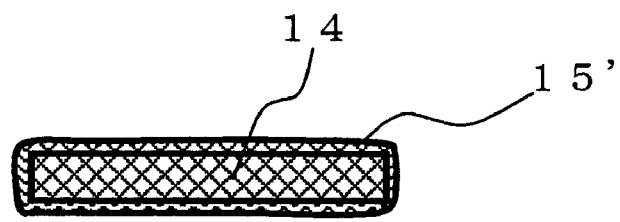
FIG. 2(c) is a schematic sectional diagram exemplifying still another aspect of the composite of the present invention.

The composite of the present invention can include various aspects as well as the aspect shown in FIG. 1(d) described in the section[Method of Manufacturing Composite] (the shape in which a metal-containing material and a carbon nanotube structure are held on the surface of a substrate). FIGS. 2(a) to 2(c) are schematic sectional diagrams showing various aspects of the composite of the present invention. In FIGS. 2(a) to 2(c), the members having the same functions as those of FIGS. 1(a) to 1(d) are denoted by the same reference numerals as those of FIGS. 1(a) to 1(d).

FIG. 2(a) shows an aspect of a composite constituted such that the metal-containing material 15' is mixed to cover the carbon nanotube structure 14 formed into a layer on the surface of the board-like substrate 12. A composite of this aspect can be manufactured by, for example, directly mixing the metal-containing material 15' with the substance in the state shown in FIG. 1(a) described above in the section [Method of Manufacturing Composite] (the substance obtained by forming the carbon nanotube structure 14 on the surface of the substrate 12).

FIG. 2(b) shows an aspect of a composite constituted such that the carbon nanotube structure 14 is dispersed in the metal-containing material 15'. A composite of this aspect can be manufactured by, for example, peeling the carbon nanotube structure composite film 16 off the substance in the state shown in FIG. 1(d) described above in the section[Method of Manufacturing Composite] (the substance obtained by forming the carbon nanotube structure 14 on the surface of the substrate 12). A composite of this aspect can also be manufactured by curing a mixed solution of a metal-containing material and a carbon nanotube structure in the state shown in FIG. 1(b) described above in the section[Method of Manufacturing Composite] under the condition that the shape of the mixed solution is maintained by, for example, charging the mixed solution into an appropriate mold.

FIG. 2(c) shows an aspect of a composite constituted such that the carbon nanotube structure 14 is surrounded by the film-like metal-containing material 15'. A composite of this aspect can be manufactured as follows. A thick carbon nanotube structure is obtained by charging the cross-linking solution into a mold, by repeatedly applying the solution, or the like. Then, a solution-like metal-containing material (for instance, an organometallic compound solution or a molten metal as described above) is applied to the carbon nanotube structure by, for example, immersing the carbon nanotube structure in the metal-containing material, and then the resultant is subjected to post treatment as required.

In each of the examples described above, a method of mixing a metal-containing material is as described above, and the optimum method can be selected appropriately. In each example, the cavities of a carbon nanotube structure itself are not shown because they are very minute. In reality, minute cavities are present in a carbon nanotube structure itself, and the cavities are filled with a metal-containing material to form the composite of the present invention. The composite of the present invention is not limited to the aspects exemplified above.

EXAMPLES

Hereinafter, the present invention will be described more specifically by way of examples. However, the present invention is not limited to the following examples.

Example 1

A composite was manufactured in accordance with the flow of the method of manufacturing a composite shown in FIGS. 1(a) to 1(d). The description of Example 1 uses the reference numerals shown in FIGS. 1(a) to 1(d) in some cases.

(A) Supplying Step (A-1) Preparation of Cross-linking Solution (Addition Step)

Figure 3:
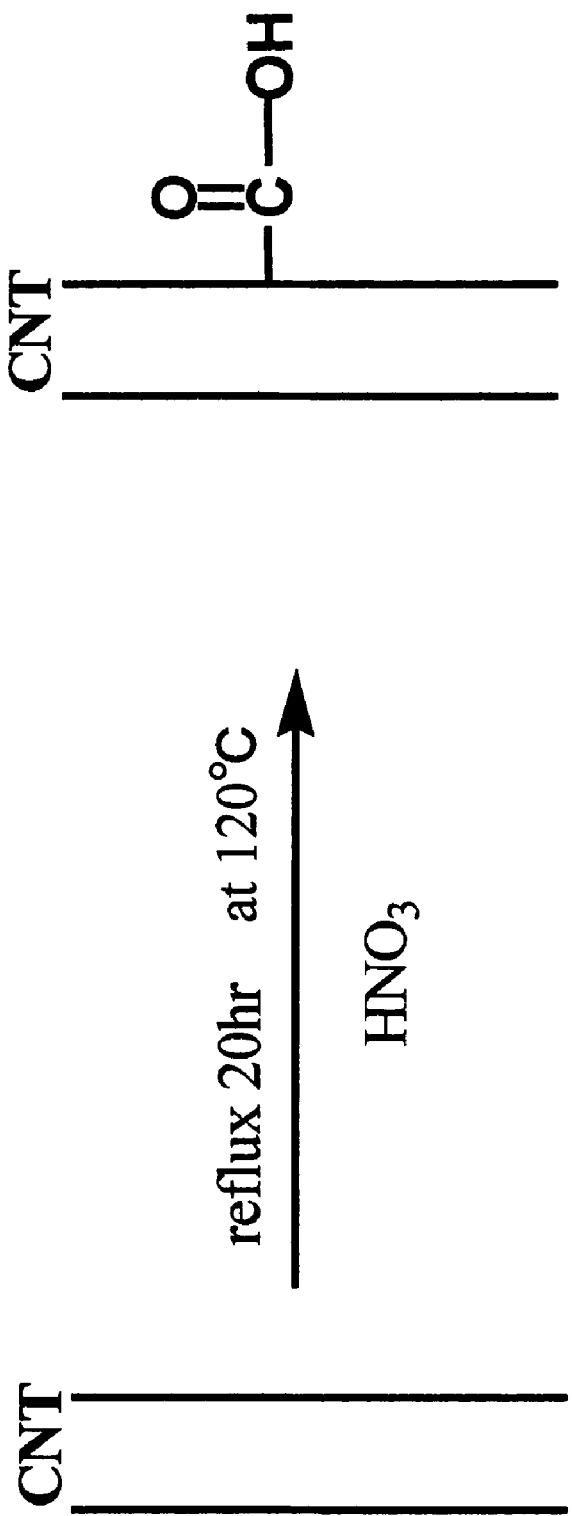
FIG. 3 shows a reaction scheme for the synthesis of a carbon nanotube carboxylic acid in (Addition Step) of Example 1.

(i) Addition of Carboxyl Group . . . Synthesis of Carbon Nanotube Carboxylic Acid 30 mg of multi-wall carbon nanotube powder (purity: 90%, average diameter: 30 nm, average length: 3 μm, available from Science Laboratories, Inc.) were added to 20 ml of concentrated nitric acid (a 60 mass % aqueous solution, available from Kanto Kagaku) for reflux at 120° C. for 20 hours, to synthesize carbon nanotube carboxylic acid. A reaction scheme of the above is shown in FIG. 3. In FIG. 3, a carbon nanotube (CNT) portion is represented by two parallel lines (the same applies for other figures relating to reaction schemes).

The temperature of the solution was returned to room temperature, and the solution was centrifuged at 5,000 rpm for 15 minutes to separate a supernatant liquid from a precipitate. The recovered precipitate was dispersed in 10 ml of pure water, and the dispersion liquid was subjected to centrifugal separation again at 5,000 rpm for 15 minutes to separate a supernatant liquid from a precipitate (the above process constitutes one washing operation). This washing operation was repeated five more times, and lastly, a precipitate was recovered.

An infrared absorption spectrum of the recovered precipitate was measured. An infrared absorption spectrum of the used multi-wall carbon nanotube raw material itself was also measured for comparison. A comparison between both the spectra revealed that absorption at 1,735 cm$^{-1}$ characteristic of a carboxylic acid, which was not observed in the multi-wall carbon nanotube raw material itself, was observed in the precipitate. This finding shows that a carboxyl group was introduced into a carbon nanotube by the reaction with nitric acid. In other words, this finding confirmed that the precipitate was carbon nanotube carboxylic acid.

Addition of the recovered precipitate to neutral pure water confirmed that dispersability was good. This result supports the result of the infrared absorption spectrum that a hydrophilic carboxyl group was introduced into a carbon nanotube.

Figure 4:
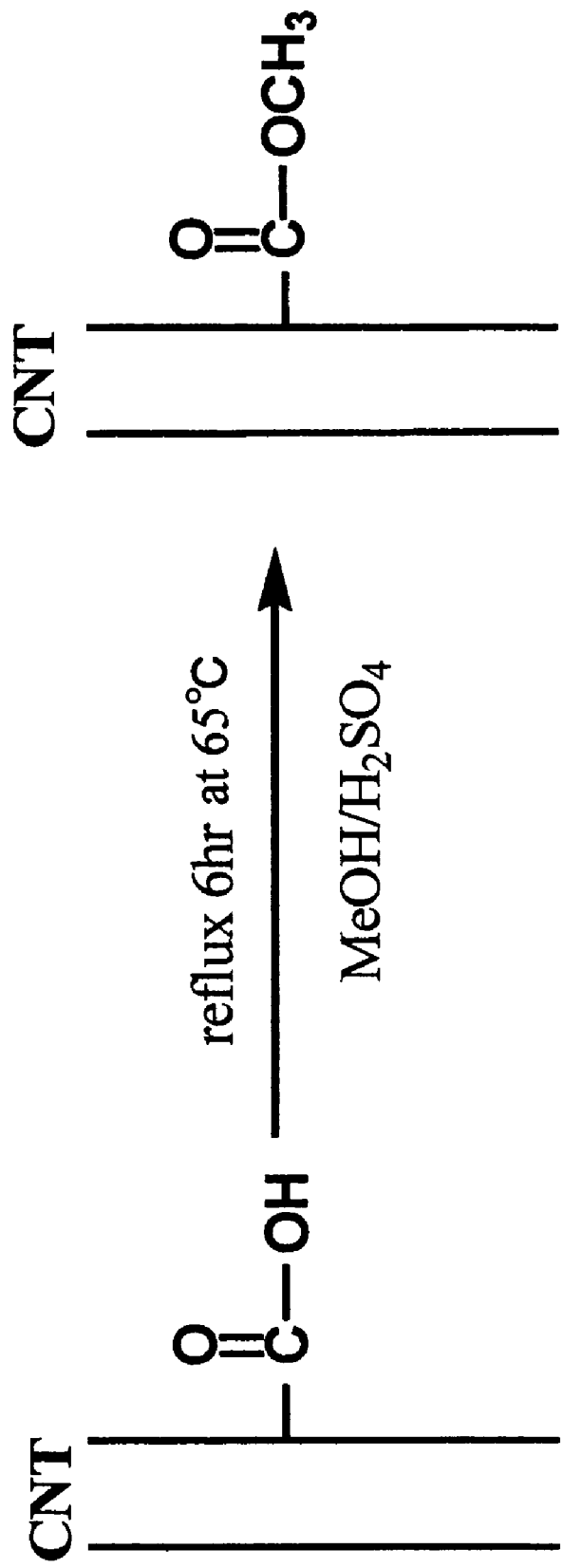
FIG. 4 shows a reaction scheme for esterification in (Addition Step) of Example 1.
Figure 5:
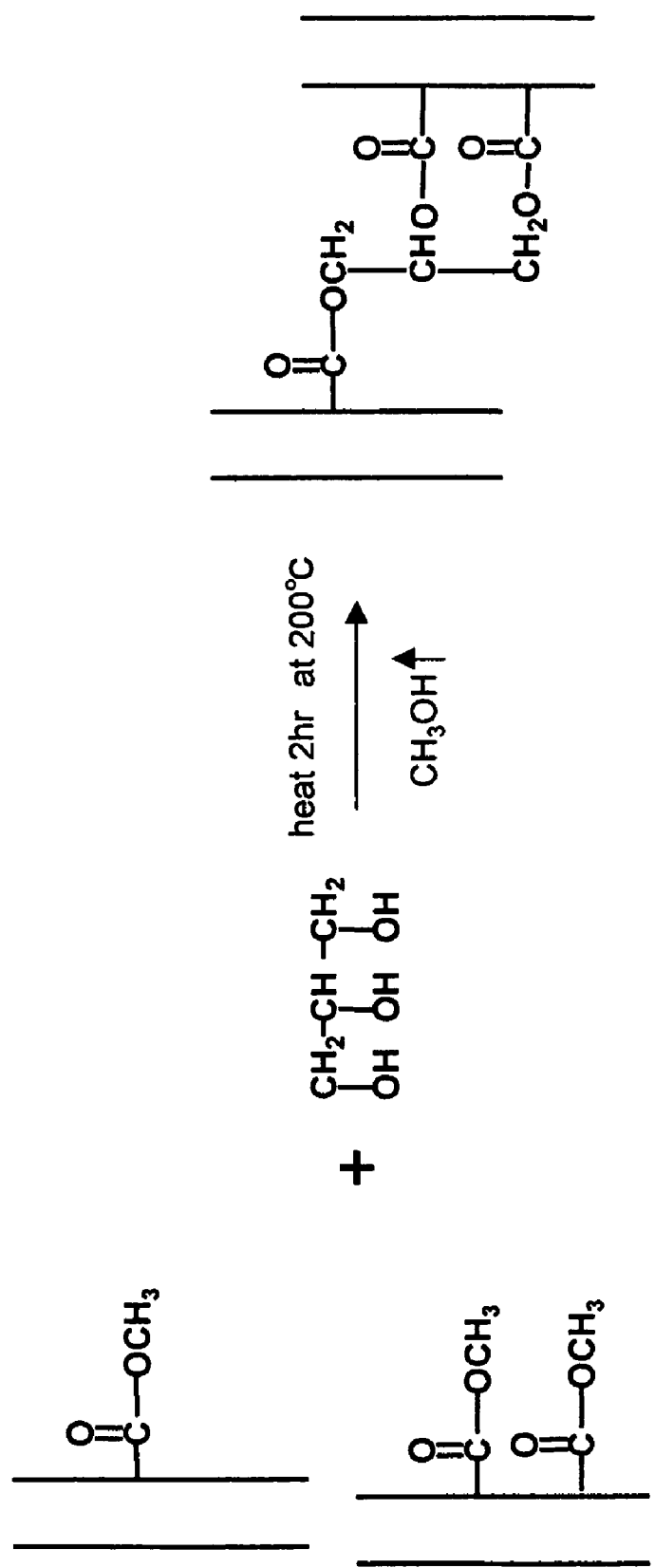
FIG. 5 shows a reaction scheme for cross-linking by an ester exchange reaction in (Cross-linking Step) of Example 1.

(ii) Esterification 30 mg of the carbon nanotube carboxylic acid prepared in the above step were added to 25 ml of methanol (available from Wako Pure Chemical Industries, Ltd.). Then, 5 ml of concentrated sulfuric acid (98 mass %, available from Wako Pure Chemical Industries, Ltd.) were added to the mixture, and the whole was refluxed at 65° C. for 6 hours for methyl esterification. The reaction scheme for the above-described methyl esterification is shown in FIG. 4.

After the temperature of the liquid solution had been returned to room temperature, the solution was filtered to separate a precipitate. The precipitate was washed with water, and was then recovered. An infrared absorption spectrum of the recovered precipitate was measured. As a result, absorption at 1,735 cm$^{-1}$ and in the range of 1,000 to 1,300 cm$^{-1}$ characteristic of ester were observed. This result confirmed that the carbon nanotube carboxylic acid was esterified.

(Mixing Step)

30 mg of the carbon nanotube carboxylic acid methyl esterified in the above step were added to 4 g of glycerin (available from Kanto Kagaku), and the whole was mixed using an ultrasonic disperser. Further, the mixture was added to 4 g of methanol as a viscosity modifier, to prepare a cross-linking solution (1).

(A-2) Surface Treatment Step of Substrate

Prepared was a silicon wafer (76.2 mmΦ (diameter of 3 inches), thickness of 380 μm, thickness of a surface oxide film of 1 μm, available from Advantech Co., Ltd.) as the substrate 12. The silicon wafer was subjected to surface treatment using the cross-linking solution (1) to be applied to the wafer and aminopropyltriethoxysilane for enhancing adsorption with the silicon wafer.

The silicon wafer was subjected to the surface treatment with aminopropyltriethoxysilane by exposing the silicon wafer to steam of 50 μl of aminopropyltriethoxysilane (available from Sigma-Aldrich Co.) for about 3 hours in a closed Schale.

(A-3) Supplying Step

The cross-linking solution (1 μl) prepared in Step (A-1) was applied to the surface of the silicon wafer subjected to the surface treatment by using a spin coater (1H-DX2, manufactured by MIKASA Co., Ltd.) at 100 rpm for 30 seconds. The solution was similarly applied to a silicon wafer which had not been subjected to the surface treatment for comparison.

(B) Cross-linking Step

After the application of the cross-linking solution, the silicon wafer (base body 12) on which the cross-linked substance film had been formed was heated at 200° C. for 2 hours to cure the structure, thereby forming the carbon nanotube structure 14 (FIG. 1(a)).

The observation of the state of the obtained carbon nanotube structure 14 by means of an optical microscope confirmed an extremely uniform cured film.

DC current-voltage characteristics measurement was carried out according to a two-terminal method by using a Picoammeter 4140B (manufactured by Hewlett-Packard) to determine the DC conductivity of the obtained carbon nanotube structure 14. The conductivity was determined to be 17 S·cm$^{-1}$. The result confirmed that the carbon nanotube structure was networked.

(C) Combining Step

The carbon nanotube structure 14 prepared in Step (B) was peeled off of the substrate 12' through scraping with a razor. Then, the structure was immersed in an aluminum primary phosphate solution 15 having a concentration of 10 mass % (FIG. 1(b)). The mixture was applied to the surface of the silicon wafer (the substrate 12) and held for 1 hour under a pressure reduced to about 1.33 kPa (10 Torr) or less. After that, the resultant was dried in the air at 120° C. (FIG. 1(c)). Further, the dried product was subjected to heat treatment at 600° C. for 2 hours to transform aluminum primary phosphate into aluminum phosphate which is insoluble in water or alcohol, followed by combination with the carbon nanotube structure 14 (FIG. 1(d)).

Aluminum phosphate can be roughly classified into 3 types depending on a molar ratio of phosphorous to aluminum: aluminum primary phosphate $Al(H_2PO_4)_3$ (P/Al=3/1), aluminum secondary phosphate $Al_2(HPO_4)_3$ (P/Al=3/2=1.5), and aluminum tertiary phosphate $AlPO_4$ (P/Al=3/3=1.0). Each of those 3 types of aluminum phosphate can be applied to a coal ash solidification technique. In particular, aluminum primary phosphate or aluminum phosphate having a phosphorous-to-aluminum ratio close to that of aluminum primary phosphate is suitable for a composite in a coal ash solidification technique because of water solubility.

Aluminum primary phosphate cures through a reaction with a mineral aggregate, condensation due to dehydration by heating, crystal transformation due to high-temperature heating, or the like to express bonding property. In a process of dehydration by heating, first stage dehydration occurs in the temperature range of 170 to 200° C. In this stage, free water and part of the water molecules in the aluminum primary phosphate molecule are mainly lost to cause condensation or polymerization, thereby establishing a bonding force. Second stage dehydration occurs in the temperature range of 230 to 280° C. In this stage, most of the water molecules in the aluminum primary phosphate molecule are lost to eliminate most of the water-solubility of the molecule, so that curing bonding property further strengthens. Next, third stage dehydration occurs around 500° C., so that the water molecules are completely lost. After that, crystal transformation occurs to further cure aluminum primary phosphate.

The composite was regarded as one having improved oxidation resistance because no deterioration of frictional characteristics was observed even when the surface was deteriorated by friction. That is, aluminum phosphate was evenly filled into the carbon nanotube structure. In other words, the above result revealed that the composite of the present invention can be a material having a high degree of combination because many metal-containing materials can be filled into its carbon nanotube structure.

(C) Combining Step 2

The carbon nanotube structure 14 prepared in Step (B) was peeled off of the substrate 12' through scraping with a razor. A small piece of indium was placed on a hot plate heated at 200° C. to turn the indium into molten indium. Then, the carbon nanotube structure 14 was immersed in the indium solution. After that, the hot plate was cooled to a temperature equal to or lower than the melting point of indium to prepare a composite of the carbon nanotube structure and indium.

What is claimed is:

1. A composite comprising a carbon nanotube structure and a metal-containing material that are mixed together, wherein
the carbon nanotube structure has a network structure constructed by mutually cross-linking functional groups bonded along the lengths of plural carbon nanotubes through chemical bonding of the functional groups together.

2. A composite according to claim 1, wherein the metal-containing material contains at least one selected from the group consisting of Al, B, Mg, K, Ca, Ag, Cr, Co, Sm, Dy, Hg, Sn, Ce, Th, Pb, Hf, Ni, Nd, Ba, Bi, Pr, Be, Mn, La, Li, Rb, Zn, Fe, Cu, Y, and Cd.

3. A composite according to claim 1, wherein the carbon nanotube structure is obtained by curing a solution containing carbon nanotubes having functional groups and a cross-linking agent that prompts a cross-linking reaction with the functional groups, to prompt a cross-linking reaction between the functional groups of the carbon nanotubes and the cross-linking agent, to thereby form a cross-linked site.

4. A composite according to claim 3, wherein the cross-linking agent is not self-polymerizable.

5. A composite according to claim 3, wherein the cross-linked site where the plural carbon nanotubes are mutually cross-linked has a chemical structure selected from the group consisting of —COO(CH$_2$)$_2$OCO—, —COOCH$_2$CHOHCH$_2$OCO—, —COOCH$_2$CH(OCO—)CH$_2$OH, and —COOCH$_2$CH(OCO—)CH$_2$OCO—.

6. A composite according to claim 1, wherein the cross-linked site is formed through chemical bonding of the plural functional groups together.

7. A composite according to claim 6, wherein a reaction that forms the chemical bonding comprises one reaction selected from the group consisting of dehydration condensation, a substitution reaction, an addition reaction, and an oxidative reaction.

8. A composite according to claim 1, wherein the cross-linked site where the plural carbon nanotubes are mutually cross-linked comprises at least one selected from the group consisting of —COOCO—, —O—, —NHCO—, —COO—, —NCH—, —NH—, —S—, NHCOO—, and —S—S—.

9. A composite according to claim 1, wherein the plural carbon nanotubes comprise multi-wall carbon nanotubes.

10. A method of manufacturing a composite, comprising:
supplying a surface of a substrate with a solution containing plural carbon nanotubes to which plural functional groups are bonded along the lengths of said nanotubes;
mutually cross-linking the plural carbon nanotubes through chemical bonding of the plural functional groups together to construct a network structure and forming a carbon nanotube structure; and mixing the carbon nanotube structure and a metal-containing material.

11. A method of manufacturing a composite according to claim 10, wherein the metal-containing material contains at least one selected from the group consisting of Al, B, Mg, K, Ca, Ag, Cr, Co, Sm, Dy, Hg, Sn, Ce, Th, Pb, Hf, Ni, Nd, Ba, Bi, Pr, Be, Mn, La, Li, Rb, Zn, Fe, Cu, Y, and Cd.

12. A method of manufacturing a composite according to claim 10, wherein the solution contains a cross-linking agent that cross-links the functional groups together.

13. A method of manufacturing a composite according to claim 12, wherein the cross-linking agent is not self-polymerizable.

14. A method of manufacturing a composite according to claim 13, wherein:

the functional groups comprise at least one functional group selected from the group consisting of —OH, —COOH, —COOR (where R represents a substituted or unsubstituted hydrocarbon group), —COX (where X represents a halogen atom), —NH$_2$, and —NCO; and the cross-linking agent is capable of prompting a cross-linking reaction with the selected functional groups.

15. A method of manufacturing a composite according to claim 12, wherein:

the cross-linking agent comprises at least one cross-linking agent selected from the group consisting of a polyol, a polyamine, a polycarboxylic acid, a polycarboxylate, a polycarboxylic acid halide, a polycarbodiimide, and a polyisocyanate; and each of the functional groups is capable of prompting a cross-linking reaction with the selected cross-linking agent.

16. A method of manufacturing a composite according to claim 13, wherein:

the functional groups comprise at least one functional group selected from the group consisting of —OH, —COOH, —COOR (where R represents a substituted or unsubstituted hydrocarbon group), —COX (where X represents a halogen atom), —NH$_2$, and —NCO;

the cross-linking agent comprises at least one cross-linking agent selected from the group consisting of a polyol, a polyamine, a polycarboxylic acid, a polycarboxylate, a polycarboxylic acid halide, a polycarbodiimide, and a polyisocyanate; and the functional groups and the cross-linking agent are respectively selected so that a combination of the selected functional groups and cross-linking agent is capable of prompting a mutual cross-linking reaction.

17. A method of manufacturing a composite according to claim 13, wherein each of the functional groups comprises —COOR (where R represents a substituted or unsubstituted hydrocarbon group).

18. A method of manufacturing a composite according to claim 17, wherein the cross-linking agent comprises at least one selected from the group consisting of glycerin, ethylene glycol, butenediol, hexynediol, hydroquinone, and naphthalenediol.

19. A method of manufacturing a composite according to claim 10, wherein the solution further contains a solvent.

20. A method of manufacturing a composite according to claim 19, wherein the cross-linking agent further functions as a solvent.

21. A method of manufacturing a composite according to claim 10, wherein a reaction that forms the chemical bonding comprises a reaction for chemically bonding the plural functional groups together.

22. A method of manufacturing a composite according to claim 21, wherein the solution further contains an additive that forms the chemical bonding of the plural functional groups together.

23. A method of manufacturing a composite according to claim 22, wherein the reaction comprises dehydration condensation and the additive comprises a condensation agent.

24. A method of manufacturing a composite according to claim 23, wherein the functional groups comprise at least one functional group selected from the group consisting of —COOR (where R represents a substituted or unsubstituted hydrocarbon group), —COOH, —COX (where X represents a halogen atom), —OH, —CHO—, and —NH$_2$.

25. A method of manufacturing a composite according to claim 24, wherein each of the functional groups comprises —COOH.

26. A method of manufacturing a composite according to claim 23, wherein the condensation agent comprises at least one selected from the group consisting of sulfuric acid, N-ethyl-N'-(3-dimethylaminopropyl)carbodiimide, and dicyclohexyl carbodiimide.

27. A method of manufacturing a composite according to claim 22, wherein the reaction comprises a substitution reaction and the additive comprises a base.

28. A method of manufacturing a composite according to claim 27, wherein the functional groups comprise at least one functional group selected from the group consisting of —NH$_2$, —X (where X represents a halogen atom), —SH, —OH, —OSO$_2$CH$_3$, and —OSO$_2$(C$_6$H$_4$)CH$_3$.

29. A method of manufacturing a composite according to claim 27, wherein the base comprises at least one selected from the group consisting of sodium hydroxide, potassium hydroxide, pyridine, and sodium ethoxide.

30. A method of manufacturing a composite according to claim 21, wherein the reaction comprises an addition reaction.

31. A method of manufacturing a composite according to claim 30, wherein the functional groups comprise at least one of —OH and —NCO.

32. A method of manufacturing a composite according to claim 21, wherein the reaction comprises an oxidative reaction.

33. A method of manufacturing a composite according to claim 32, wherein each of the functional groups comprises —SH.

34. A method of manufacturing a composite according to claim 33, wherein the solution further contains an oxidative reaction accelerator.

35. A method of manufacturing a composite according to claim 34, wherein the oxidative reaction accelerator comprises iodine.

36. A method of manufacturing a composite according to claim 21, wherein the surface of the substrate is supplied with a solution, which contains: the plural carbon nanotubes to which the plural functional groups are bonded; and a solvent, in the supplying.

37. A method of manufacturing a composite according to claim 22, wherein the surface of the substrate is supplied with a solution, which contains: the plural carbon nanotubes to which the plural functional groups are bonded; the additive; and a solvent, in the supplying.

* * * * *